(12) United States Patent
Greiner

(10) Patent No.: US 10,928,294 B2
(45) Date of Patent: Feb. 23, 2021

(54) METHOD FOR IDENTIFYING AND QUANTIFYING OF EMITTING PARTICLES IN SYSTEMS

(71) Applicant: Fraunhofer-Gesellschaft, Munich (DE)

(72) Inventor: Benjamin Greiner, Koenigswinter (DE)

(73) Assignee: FRAUNHOFER-GESELLSCHAFT, Munich (DE)

( * ) Notice: Subject to any disclaimer, the term of this patent is extended or adjusted under 35 U.S.C. 154(b) by 0 days.

(21) Appl. No.: 16/180,735

(22) Filed: Nov. 5, 2018

(65) Prior Publication Data

US 2019/0212246 A1    Jul. 11, 2019

Related U.S. Application Data

(63) Continuation of application No. 14/903,784, filed as application No. PCT/EP2014/064421 on Jul. 7, 2014, now abandoned.

(30) Foreign Application Priority Data

Jul. 8, 2013  (DE) .................... 10 2013 213 362.6

(51) Int. Cl.
*G01N 15/14* (2006.01)
*G01N 21/64* (2006.01)

(52) U.S. Cl.
CPC ............. *G01N 15/14* (2013.01); *G01N 21/64* (2013.01); *G01N 21/6408* (2013.01);
(Continued)

(58) Field of Classification Search
CPC ..... G01N 15/14; G01N 21/6408; G01N 21/64
See application file for complete search history.

(56) References Cited

U.S. PATENT DOCUMENTS 6,208,815 B1    3/2001  Seidel et al.
6,515,289 B1    2/2003  Kask
(Continued)

FOREIGN PATENT DOCUMENTS

DE    60001731 T2    2/2004
EP    0679251        4/1998
(Continued)

OTHER PUBLICATIONS

English language PCT International Search Report dated Sep. 29, 2014, received in corresponding PCT Application No. PCT/EP14/64421, 2 pgs.
(Continued)

*Primary Examiner* — Michele Fan
(74) *Attorney, Agent, or Firm* — Grossman, Tucker, Perreault & Pfleger, PLLC

(57) ABSTRACT

The invention relates to a method for quantifying emitting particles and for characterizing the time-dependent behavior of the particles. The number n of emissions of the particles in the measuring period that have been detected in a time interval having a predetermined interval width within the measuring period is ascertained, wherein the evaluation is performed particularly for a plurality of time intervals having the same interval width, with a distribution function p(n) for the number n of detected emissions being determined. For the interval width different bin times $\tau$ are stipulated, and, for each bin time $\tau$, the evaluation is performed and a distribution function $p_\tau(n)$ is ascertained, wherein, for each bin time $\tau$, moments $m_{i,\tau}^{Mess}$ for the distribution function $p_\tau(n)$ are ascertained, from which bin time dependent moment functions $m_i^{Mess}(\tau)$ are presented. Comparison with a theoretical signal function comprising moments $m_i^{sig}(\tau)$ for the theoretical signal distribution
(Continued)

ascertains constants that characterize the particles in the system.

17 Claims, 11 Drawing Sheets

(52) U.S. Cl.
CPC ............... *G01N 2015/1402* (2013.01); *G01N 2015/1486* (2013.01); *G01N 2021/6417* (2013.01)

(56) References Cited

U.S. PATENT DOCUMENTS

| | | | |
|---|---|---|---|
| 6,582,903 | B1 | 6/2003 | Rigler et al. |
| 6,780,589 | B1 | 8/2004 | Gulati |
| 2003/0206297 | A1 | 11/2003 | Barbieri et al. |
| 2004/0080818 | A1 | 4/2004 | Olschewski |
| 2006/0176479 | A1 | 8/2006 | Laurence et al. |
| 2010/0224797 | A1 | 9/2010 | Laidevant et al. |

FOREIGN PATENT DOCUMENTS

| | | |
|---|---|---|
| EP | 1174706 A2 | 1/2002 |
| WO | 9816814 A1 | 4/1998 |
| WO | 0159416 A1 | 8/2001 |
| WO | 2008080417 A1 | 7/2008 |

OTHER PUBLICATIONS

English language International Preliminary Report on Patentability with English translation of Written Opinion dated Jan. 12, 2016, received in corresponding PCT Application No. PCT/EP14/64421, 6 pgs.

Qian, H. et al, "Distribution of Molecular Aggregation by Analysis of Fluctuation Moments", In: Proc. Natl. Acad. Sci USA, Biophysics, vol. 87, Jul. 1990, pp. 5479-5483.

Palmer III, A.G. et al, "High-order Fluorescence Fluctuation Analysis of Model Protein Clusters", In: Proc. Natl. Acad. Sci USA, Biophysics, vol. 86, Aug. 1989, pp. 6148-6152.

Qian, H. et al, On the Analysis of High Order Moments of Fluorescence Fluctuations, In: Biophys. J., Biophysical Society, vol. 57, Feb. 1990, pp. 375-380.

Chen et al, "The Photon Counting Histogram in Fluorescence Fluctuation Spectroscopy", Biophysical Journal, vol. 77, pp. 553-567, Jul. 1999, Massachusetts.

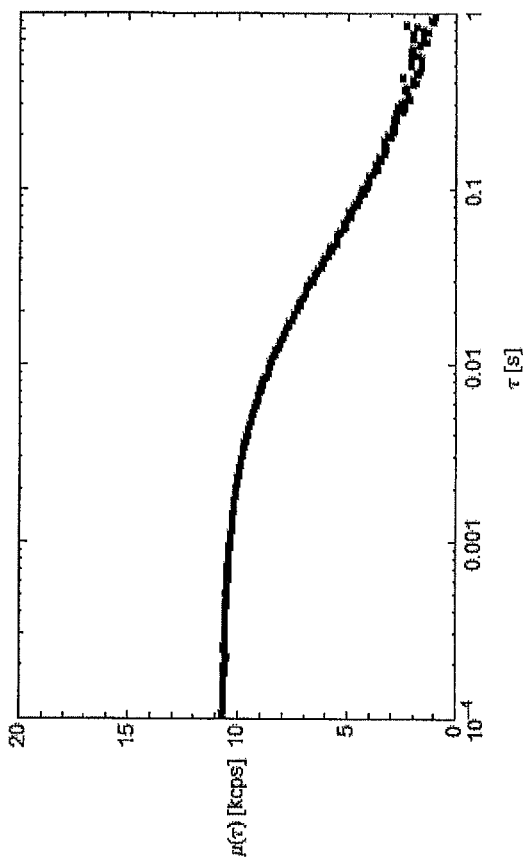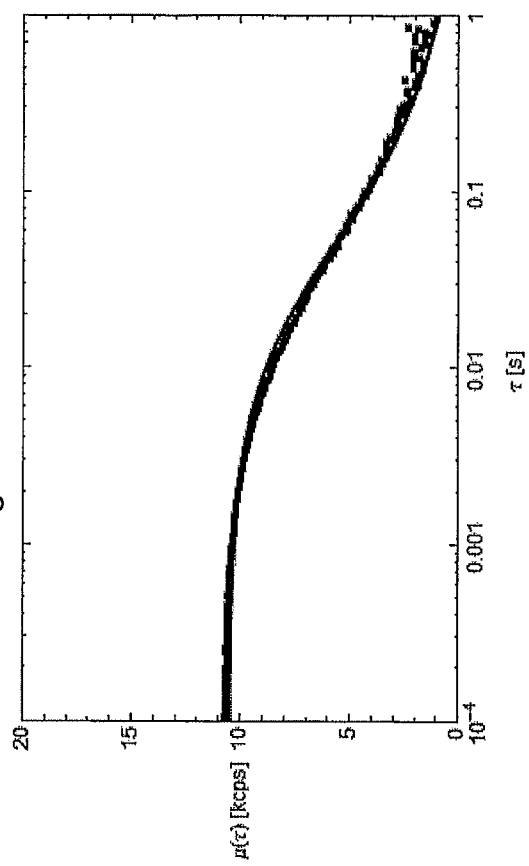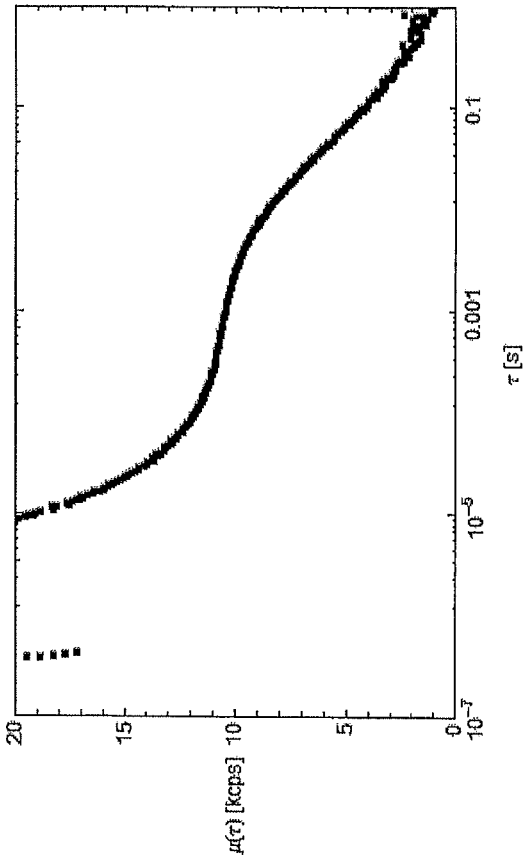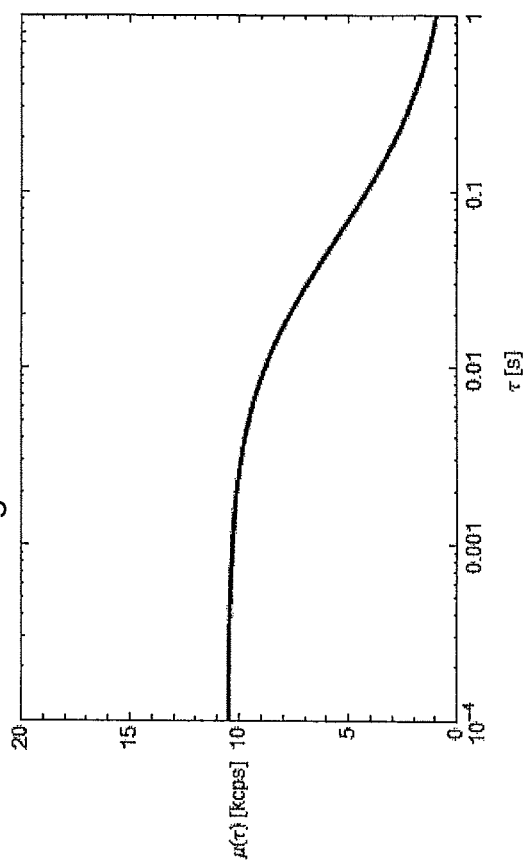

METHOD FOR IDENTIFYING AND QUANTIFYING OF EMITTING PARTICLES IN SYSTEMS

The present invention relates to a method for quantification of particles emitting specific emitted entities (hereinafter "emittends") and for characterization of the time-dependent behavior of the particles in a system comprising at least particles of a species j.

Such methods are conventionally employed in the field of fluorescence fluctuation spectroscopy, where particles emitting photons as emittends are quantified and characterized. Conventionally the particles are stimulated by means of an external light source, e.g. a laser, and the emission characteristics of the particles are determined by detection, whereby conclusions on the particles in the system can be drawn.

Fluorescence correlation spectroscopy (FCS) has proven in the past to be a particularly advantageous method for quantifying and characterizing particles in a system, as described e.g. in EP 0 679 251 B1. A system which conventionally is a solution comprising different particles having specific partial concentrations is measured by means of a confocal microscope lens. On the one hand, a laser beam of a stimulating laser is imaged into the system with such a confocal microscope lens in such a way that just a very small stimulation volume is illuminated by the laser, on the other hand the photons being emitted by the particles present in the stimulation volume are imaged by the confocal microscope lens on a detector. The stimulation volume can thus be restricted to less than 1 fl by the known confocal microscope lenses.

In the method according to FCS a fluorescence signal is determined which indicates over the measuring period the number of photons the detector detects during the measuring period. Thus the time-dependent course of the number of detected photons can be read from the fluorescence signal. Information on the diffusion constant of the emitting particles, the emission characteristics of the particles and the partial concentration of the particles can then be ascertained from the time-dependent autocorrelation function of the fluorescence signal. FCS methods are also known from prior art, in which the measuring period is divided into a plurality of time intervals having equal length and the number of detected photons is determined for each of the time intervals. From this the fluorescence signal is determined which represents the time-dependent course of the number of photons detected during the time intervals over the measuring period. Accordingly this allows obtaining information on the partial concentrations of the particles and the diffusion constants of the different species of particles in the system from the autocorrelation function of the fluorescence signal.

Hence the FCS method is based on the determination of the time-dependent performance of the fluorescence signal by means of the autocorrelation function. Thus information on particles of different species in the monitored system is determined from this time-dependent data. In FCS however the brightness, i.e. the absolute number of detected photons, is not used for characterizing and quantifying the particles in the system. Obtaining information on the particles of the system is carried out by means of a set of data which is significantly reduced compared to the data collected by the detector, which comprises inter alia the absolute number of detected photons. In consequence the FCS method is barely suited for several fields of application. For example the FCS method is not suited for determining the partial concentrations of and characterizing particles of different species in the system, if the particles of different species exhibit similar mass and/or similar diffusion coefficients in the system.

In order to confront these problems of the FCS method, the PCH (photon counting histogram) method is often used in combination with the FCS method. In this context the PCH method is based upon obtaining data by means of detection of photons which are emitted by particles in the system as is the FCS method, wherein the collection of data is carried out by means of a confocal microscope lens together with stimulation by a laser source, as described above. The PCH method is e.g. described in Chen Y. et al., The photon counting histogram in fluorescence fluctuation spectroscopy, Biophysical Journal, 77, 553-567, 1999. In the PCH method the number of photons which were detected in one time interval having a predetermined interval width is determined several times during the measuring period. A photon count rate histogram is prepared from these data which indicates the distribution of the number of detected photons. Information on the absolute number of photons detected in the time interval is thus contained in the photon count rate histogram. So the PCH method is suited to allow quantifying of particles in a system comprising particles of different species, each having a different radiation characteristic, in particular determining the partial concentrations of the different species. However the PCH method is not suited for analyzing time-dependent behavior of the particles in the system, since the data determined in the PCH methods do not contain time-dependent information.

The FCS method as well as the PCH method allows determining data characterizing the particles of different species in the system under measurement by evaluating the data determined by the FCS or PCH method, respectively, by means of numerical algorithms. As explained above the PCH and FCS methods offer access to different typical data which characterize the particles of different species and the partial concentrations thereof in the system. It is always necessary to carry out the FCS method and the PCH method completely in order to obtain an comprehensive characterization. This is time-consuming and requires significant computer resources. Furthermore the combination of PCH and FCS methods cannot guarantee complete analysis of a system having particles of different species. In particular the analysis of the time-dependent behavior in a system having different species which exhibit similar diffusion constants and/or similar masses is hardly possible. In particular when observing time-dependent processes such as e.g. biochemical reactions occurring in systems between particles of different or identical species, it is hardly possible to analyze measurement data obtained through a confocal microscope lens by means of FCS or PCH methods in order to obtain data on the chemical reactions.

It is therefore an object of the present invention to provide a method for quantification of emitting particles and for characterization of the time-dependent behavior of the particles in a system which solves the problems mentioned above at least partially and which allows a simpler and/or more extensive analysis of the particles in the system.

According to the invention a method is proposed to solve said technical object. With the method according to the invention the emissions of particles during a measuring period are detected in a measurement step. In an evaluation step the number n of the emissions having been detected in a time interval of predetermined interval with within the period is thereafter ascertained and stored. In particular the evaluation can be carried out for several time intervals having the same interval width within the measuring period. The time intervals can in particular be chosen so that they do not overlap. In the evaluation a distribution function p(n) of the number of detected emissions n is determined. The distribution function p(n) indicates the relative frequency of determining the different values for the number n. In the case of an evaluation where values between 0 and m have been determined for the number n of the detected emissions in time intervals each having the same interval width thus applies:

$$\sum_{n=0}^{m} p(n) = 1.$$

The method according to the invention is distinguished by stipulating different bin times $\tau$ as interval width, carrying out the evaluation for each bin time $\tau$ and determining a distribution function $p_\tau(n)$. In doing so the distribution function $p_\tau(n)$ indicates the relative frequency of detecting the different values for the number n of emissions in a time interval having the bin time $\tau$ as interval width. Thus a distribution function $p_\tau(n)$ is determined for each bin time $\tau$. Thus for each being time $\tau$ a distribution function $p_\tau(n)$ is determined. From the distribution function $p_\tau(n)$ the moments $m_{i,\tau}^{Mess}$ are determined as characteristics of the distribution function $p_\tau(n)$ in a conventional manner. Here from moment functions $m_i^{Mess}(\tau)$ dependent on bin time are derived wherein the moment functions $m_i^{Mess}(\tau)$ are formed across the individual points $m_{i,\tau}^{Mess}$ at the respective bin times $\tau$. For example the first moment function $m_1^{Mess}(\tau)$ is prepared using the first moments $m_{1,\tau}^{Mess}$ of the distribution function $p_\tau(n)$ at the respective bin times $\tau$. This applies accordingly to higher moment functions relating to higher moments, which are prepared from corresponding higher moments of the distribution functions $p_\tau(n)$ for different bin times $\tau$.

In the method according to the invention the analysis of the measurement data determined within the measuring period or the emissions determined within the measuring period, respectively, is carried out on the basis of the measurement data set, which comprises the moment functions $m_i^{Mess}(\tau)$. According to the invention the evaluation of the data set comprises a numerical fit of a theoretical signal function comprising moments $m_i^{sig}(\tau)$ of a theoretical signal distribution $P_{sig}(n,\tau)$ to a measurement function comprising the moment function $m_i^{Mess}(\tau)$, whereby constants characterizing the particles in the system and contained in $P_{sig}(n,\tau)$ are ascertained. Measurement function and theoretical signal function comprise $m_i^{Mess}(\tau)$ or $m_i^{sig}(\tau)$, respectively, in the sense that the measurement function can be represented by a function comprising $m_i^{Mess}(\tau)$ and the signal function can be represented by a function comprising $m_i^{sig}(\tau)$. Further the measurement data set can comprise the time resolved progress of the number n during the measuring period as well as the $p_\tau(n)$ calculated therefrom. Thus the measurement data set comprises such extensive information on the measurement results, that an extensive characterizing and quantifying of the particles in the system is possible.

The evaluation can be based on a theoretical signal distribution $P_{sig}(n,\tau)$ of the system, which is defined so as to comprise those parameters which are independent on bin time $\tau$. Starting from theoretical formulations known e.g. from the FCS or PCH methods the skilled person is able to give an expression for $P_{sig}(n,\tau)$ without difficulty.

In one embodiment of the present invention the following assumptions are made in the formulation of the theoretical signal distribution $P_{sig}(n,\tau)$:

A specific local detection rate $\mu_j(\vec{r})=\mu_{0,j}f(\vec{r})$ is assumed for a particle of the species j. It is assumed that this local detection rate $\mu_j(\vec{r})$ applies to each particle of the species j. For a system containing particles of different species a characteristic specific local detection rate is assumed for each species, e.g. the local detection rate $\mu_b(\vec{r})=\mu_{0,b}f(\vec{r})$ for the species b.

Hereinafter the specific local detection rate $\mu_j(\vec{r})$ of the species j will be explained in detail. The explanations can be applied in a similar way to the specific local detection rate of other species which may be present in the system. The parameter $\mu_{0,j}$ represents a characteristic detection brightness of a particle of species j. Therefore the parameter $\mu_{0,j}$ is a constant comprising characteristic properties of a particle of the species j as well as of the measurement device. E.g. the constant $\mu_{0,j}$ comprises properties of the particle of the species j like the cross-section or the quantum efficiency of such a particle. Besides of this $\mu_{0,j}$ comprises device-dependent values like e.g. the quantum efficiency of the detector or, if applicable, the maximum stimulation rate for stimulating the particles in the system to emit. The function $f(\vec{r})$ represents the local dependency of the local detection rate. The local detection rate changes depending on where the particle is located in the system to be measured. The function $f(\vec{r})$ can e.g. comprise the locally dependent properties of the lens system employed in the measuring apparatus and/or the locally dependent properties of the stimulation profile, e.g. the locally dependent intensity distribution of the imaging of a laser into the system. The function $f(\vec{r})$ can e.g. be given via the normalized point-spread-function of the measuring apparatus by the equation $$f(\vec{r}) = \frac{PSF(\vec{r})}{PSF(\vec{r}=0)} \leq 1 \,\forall\, \vec{r} \in R.$$

Herein R represents the volume in which a particle of the species j can be located theoretically during the measurement. The formulation of the normalized point-spread-function for a measuring apparatus is sufficiently known and can be carried out by the skilled person for the measuring apparatus used in each case.

Furthermore it is assumed that each particle of the species j has a specific local probability distribution and a specific local emission probability. When applying the method according to the invention to a system having different species a typical specific local probability distribution and typical local emission probability is assumed for the particles of each species. The local probability distribution represents the probability for the particle being in a specific location. The local emission probability represents the probability that the particle emits an emittend. Depending on the kind of emission and on the boundary conditions of the measuring apparatus the skilled person may select a suitable known probability distribution as the expected specific local probability distribution and as the expected specific local emission probability of the particles of one species and is able to accept it for formulating the theoretical signal distribution $P_{sig}(n,\tau)$.

Furthermore it is assumed for formulating $P_{sig}(n,\tau)$ that the particles have to be located in a specific measuring volume V in order to enable detection of emissions of the particles. E.g. it can be assumed that the measuring volume V is determined in the system by means of the imaging volume of a stimulating laser, if the emission of the particles is based upon stimulation by a laser and only particles stimulated by a laser can emit emittends. E.g. the measuring volume V can also be defined by a limitation of the volume given by the measuring apparatus. Such limitation can e.g. be a purely geometrical outer confinement of the system like a wall. Such limitation can e.g. also be predetermined on the basis of the lens which projects the emission of the particles onto the detector.

The theoretical signal distribution $P_{sig}(n,\tau)$, the definition of which is based upon the assumptions mentioned above, comprises as parameters which do not depend on the bin time the local detection rate $\mu_j(\vec{r})$, a particle concentration $c_j$ and a decay time $\theta_j$ of the particle species j. In addition the theoretical signal distribution $P_{sig}(n,\tau)$ of the system comprises the noise performance of the measuring apparatus. The noise performance of the measuring apparatus can assumed to be constant with time or can also be assumed as dependent from time or variable with time, respectively, in particular as a value having a statistic distribution. When defining the theoretical signal distribution $P_{sig}(n,\tau)$ it can also be assumed that the noise performance of the measuring apparatus can be neglected. The so defined theoretical signal distribution $P_{sig}(n,\tau)$ also comprises the noise performance of the measuring apparatus. When applying the method to the system in which different particle species are expected, the theoretical signal distribution $P_{sig}(n,\tau)$ of the system comprises corresponding parameters independent of the bin time for each of the particle species.

Having defined the signal distribution $P_{sig}(n,\tau)$ moments $m_i^{sig}(\tau)$ are ascertained in a conventional manner. E.g. the first moment $m_1^{sig}(\tau)$ and the second moment $m_2^{sig}(\tau)$ of the signal distribution $P_{sig}(n,\tau)$ can be ascertained. Further the theoretical signal function is defined which comprises at least one of the ascertained moments $m_i^{sig}(\tau)$ as well as a measurement value function which comprises at least one of the ascertained moment functions $m_i^{Mess}(\tau)$. At least constants with respect to at least the parameters $\mu_{0,j}$ and $\theta_j$ are then ascertained by means of a numerical fit of the theoretical signal function with the measurement value function. This means that at least $\mu_{0,j}$ and $\theta_j$ can be immediately calculated from the constants. In particular in an valuation by applying the method according to the invention to a system having s different particle species constants referring to the s different partial concentrations $c_j, c_{j+1} \ldots c_{j+s-1}$ can also be ascertained from the numerical fit.

E.g. the theoretical signal function can exhibit the same K-th moments $m_K^{sig}(\tau)$ as correspondingly has the measurement value function over $m_K^{Mess}(\tau)$. In order to give an example: the theoretical signal function can e.g. encompass $m_1^{sig}(\tau)$, $m_2^{sig}(\tau)$ and $m_3^{sig}(\tau)$ and the measurement value function can encompass $m_1^{Mess}(\tau)$, $m_2^{Mess}(\tau)$ and $m_3^{Mess}(\tau)$. In particular the theoretical signal function and the measurement value function can only exhibit the same K-th moments at each time. Herein the theoretical signal function exhibits only such K-th moments $m_K^{sig}(\tau)$ which are correspondingly contained as $m_K^{Mess}$ in the measurement value function and vice versa. In particular the K-th moments $m_K^{sig}(\tau)$ of the theoretical signal function can have the same functional relationship to one another as have the corresponding K-th moments $m_K^{Mess}(\tau)$ in the measuring value function.

The method according to the invention is suited for an analysis of any system which comprises particles of at least one species emitting specific emittends. Such emittends can e.g. be photons, but e.g. can also be α-particles or gamma radiation. Depending on the nature of the emittends and the properties of the particles stimulation from outside can be necessary or not.

The method according to the invention is based upon the fundamental finding that the moment functions $m_i^{Mess}(\tau)$ depending on bin time comprise information on the absolute number of detected emissions as well as on the time-dependent performance of the particles. Through definition of the measuring value function comprising moment functions $m_i^{Mess}(\tau)$ a function is thus provided which is based upon measurement values and which allows an extended and detailed analysis of the system or the particles in the system, respectively. Based upon this finding the invention suggests varying the bin time τ, determining the distribution function $p_\tau(n)$ for each bin time τ and determining the moment functions $m_i^{Mess}(\tau)$ depending on bin time.

Further the method according to the invention is based upon the finding that by numerically fitting the measurement value function to a theoretical signal function comprising moments $m_i^{sig}(\tau)$ of the theoretical signal distribution $P_{sig}(n,\tau)$ constants can be ascertained which do not depend on bin time and which characterize the particles in the system and the concentration of the particles in the system. In one embodiment the constants relate at least to the parameters $\mu_{0,j}$ and $\theta_j$, in particular also $c_j$, in particular $c_j$ of the different species, if there is a system having several species. The constants can e.g. be identical to $\mu_{0,j}$, $c_j$ and/or $\theta_j$. E.g. the constants can contain $\mu_{0,j}$, $c_j$ and/or $\theta_j$ in one constant in each case, they can e.g. have a mathematical ratio with constant values, e.g. numbers. In particular $\theta_j$ can encompass several components, which have to be determined independent from each other by means of numerical fitting, e.g. a separate decay component $\theta_{j,x}$, $\theta_{j,y}$, $\theta_{j,z}$ for each spatial dimension. E.g. the theoretical signal function for each of the decay components can encompass a constant relating to the respective decay component.

The parameters not depending on bin time are determined by numerical comparison of the theoretical signal function with the measurement value function. The numerical comparison is carried out computer-controlled, wherein the constants contained in the theoretical signal function which encompass the parameters not depending on bin time, i.e. $\mu_{0,j}$ and $\theta_j$ and in particular $c_j$, are adjusted in numerical comparison so that the functional course of the theoretical signal function adjusts to the functional course of the measurement value function. The skilled person is thus able to define a theoretical signal distribution $P_{sig}(n,\tau)$ taking in account the aforementioned assumptions in order to determine the theoretical signal function in view of a compromise which does not request too much computer capacity and still allows a sufficiently precise specification of the relevant constants, in particular of parameters $\mu_{0,j}$, $c_j$ and $\theta_j$.

Using the aforementioned assumptions the skilled person is enabled to define a theoretical signal distribution $P_{sig}(n,\tau)$ for the system. The specific local probability distribution indicates the probability to find a particle of species j at a certain time t in a certain location $\vec{r}$. Correspondingly the specific local probability distribution can be indicated by the function $\psi(\vec{r},t)$. The skilled person can determine the function $\psi(\vec{r},t)$ by means of the boundary conditions of the measuring apparatus and the measuring environment. For this purpose the spatial limitation of the system only and/or the transportation of the particles or the movement of the particles in the system, e.g. whether there is a free stochastic diffusion or fluidic transport, respectively, may be relevant. In case of diffusion the local probability distribution can e.g. be defined by means of the known homogeneous transport equation, wherein under the assumption that the particle is in location $\vec{r}_0$ at time $t_0$ for $\psi(\vec{r},t|\vec{r}_0,t_0)$ can be assumed:

$$\frac{\partial}{\partial t}\psi(\vec{r}, t | \vec{r}_0, t_0) = D\Delta\psi(\vec{r}, t | \vec{r}_0, t_0).$$

The skilled person can stipulate corresponding local probability distributions relating to other measuring apparatuses having different measuring environments, which predetermine different boundary data for the determination of $\tau(\vec{r},t|\vec{r}_0 t_0)$ in particular in case of a fluidic mass transport of the particles in the system.

The nature of the emission process of the particles is relevant for assuming a specific local emission probability. The emission process can depend e.g. on the internal structure of the particles and/or on interaction of the particles with the stimulating field. The internal structure can e.g. be a related to the emission generating transitions within the particles. In case of emission of photons the specific local emission probability can e.g. often be approximated by a Poisson distribution. E.g. the skilled person can make use of known local emission probabilities depending on the nature of the emittends in order to define the theoretical signal distribution $P_{sig}(n,\tau)$.

As explained above the skilled person can indicate without problems a function $f(\vec{r})$ in order to determine the specific local detection rate $\mu_j(\vec{r})$ for defining the theoretical signal distribution $P_{sig}(n,\tau)$ if utilizing a known point-spread-function of the measuring apparatus.

Hence the present invention is also based upon the finding that it is possible to define a theoretical signal distribution $P_{sig}(n,\tau)$ by defining a specific local probability distribution which determines the probability to find a particle in place $\vec{r}$ at time t, by determining a specific local emission probabilities which indicates the probability for a particle in location $\vec{r}$ to emit an emittend, by determining a specific local detection rate $\mu_j(\vec{r})$ taking in account specific brightness characteristics of the particle and detection characteristics of the measuring apparatus, and by assuming a specific measuring volume V in which the particle has to be located in order to enable detecting emissions of the particle.

When utilizing the above-mentioned assumptions the skilled person is enabled to determine a theoretical signal distribution. When applying the method according to invention e.g. to a system having particles emitting photons as emittends, the skilled person can assume a functional dependence as is assumed in the development of the PCH-method (see Chen Y. et al., Biophysical Journal, 77, 553-567, 1999 and the further developments of the PCH-method as known in the literature). When defining the theoretical signal distribution $P_{sig}(n,\tau)$ for a system having just one species j emitting emittends the skilled person can, when assuming that only particle is present in the measuring volume, assume that $P_{sig}(n,\tau)$ is given by the simple functional dependency $$P_{sig}(n, \tau) = P_{1,j}(n, \tau) = \frac{1}{V}\int_0^\tau \int_V c_j\mu_j(\vec{r})\psi_j(\vec{r}, t)E_j(n, t)d^3rdt,$$

wherein $E_j(n,t)$ is the specific local emission probability of the particles of the species j and wherein the decay time $\theta_j$ is taken in account when formulating $\psi_j(r,t)$. $\theta_j$ can e.g. indicate an average reaction time during which a particle of the species j can react so that it can no longer emit emittends. $\theta_j$ can e.g. indicate the travelling time of a particle of species j through the measuring volume V. $\theta_j$ can e.g. indicate the half-life for the decay of a particle of species j. In formulating this signal distribution for a particle to be observed the noise performance of the detector unit can e.g. be taken into account by:

$$P_{sig}(n, \tau) = P_{1,j}(n, \tau) = \frac{1}{V}\int_0^\tau R(n, t)\int_V c_j\mu_j(\vec{r})\psi_j(\vec{r}, t)E_j(n, t)d^3rdt.$$

Herein the noise performance of the measuring apparatus can be considered by $R(n,t)$. From such a $P_{sig}^1(n,\tau)$ the signal distribution for a system having an arbitrary number m of particles can e.g. be formulated by an m-fold convolution of $P_{sig}^1(n,\tau)$ and under consideration of the probability to find m particles in the measuring volume as being:

$$P_{sig}(n, \tau) = \sum_{m=1}^\infty [(P_{m-1,j} \otimes P_{1,j})(n, \tau)]\chi(m, \tau).$$

The detector noise can e.g. be considered only now by:

$$P_{sig}(n, \tau) = R(n, \tau) \otimes \left[\sum_{m=1}^\infty [(P_{m-1,j} \otimes P_{1,j})(n, \tau)]\chi(m, \tau)\right].$$

Other functional correlations can be assumed by a skilled person in carrying out the method according to invention when taking in account the assumptions according to the invention for defining the theoretical signal distribution $P_{sig}(n,\tau)$. In particular the skilled person can assume that utilizing said assumptions a function can be established which has to be integrated over the specific measuring volume V and thereafter over the time period of the bin time $\tau$ in order to define the theoretical signal distribution $P_{sig}(n,\tau)$. The determination of the moments $m_i^{sig}(\tau)$ of the theoretical signal distribution $P_{sig}(n,\tau)$ can then be carried out based upon conventional mathematical transformations or algorithmic increases.

The local detection rate $\mu_j(\vec{r})$, the specific local probability distribution and the specific local emission probability are separately established for each species in order to define the theoretical signal distribution $P_{sig}(n,\tau)$. However at least several of the functions mentioned can also be established as being identical for each species. In particular the specific local probability distribution and the specific local emission probability can be stipulated as being identical for each species.

In an advantageous embodiment an individual theoretical species signal distribution $P_{sig}^j(n,\tau)$ particular for each species of particles is determined in applying the method according to the invention to a system having s different species of particles. The theoretical signal distribution $P_{sig}(n,\tau)$ of the system is then determined by s+1-fold convolution of the s different signal distributions $P_{sig}^j(n,\tau)$ of the s different species and at noise signal distribution $P_{noise}(n,\tau)$. In one embodiment of the method according to the invention the noise signal distribution $P_{noise}(n,\tau)$ can be neglected, so that the theoretical signal distribution $P_{sig}(n,\tau)$ of the system can be defined by s-fold convolution of the s different signal distributions $P_{sig}{}^{j}(n,\tau)$. Said advantageous embodiment allows a comparatively simple setup of theoretical species signal distributions $P_{sig}{}^{j}(n,\tau)$ separately for each individual species. Thereafter a concrete indication of the theoretical signal distribution $P_{sig}(n,\tau)$ of the total system encompassing the particles of the s different species can be carried out by convolution of the s theoretical species signal distributions.

In a further advantageous embodiment of the method according to the invention the measuring volume V utilized for defining $P_{sig}(n,\tau)$ is being defined by means of a bin time dependent effective volume $V_{eff,j}(\tau)$ introduced fictitiously. $V_{eff,j}(\tau)$ is being defined in the manner, that by definition at least one emission is detected during the bin time $\tau$ for each particle of species j which is present in the volume $\tau V_{eff,j}(\tau)$, and that the particle does not leave the volume $\tau V_{eff,j}(\tau)$ during bin time $\tau$, wherein by definition the average number of the particles of species j in the volume $V_{eff,j}(\tau)$ is determined by a mean population number $\omega_j(4)$, wherein $\omega_j(\tau)=c_j V_{eff,j}(\tau)\tau$.

When doing so, it has to be considered, that the effective volume $V_{eff,j}(\tau)$ is not the volume spatially delimited by the measuring apparatus. Rather the effective volume $V_{eff,j}(\tau)$ is a bin time dependent means introduced by a mental experiment in order to simplify defining the theoretical signal distribution $P_{sig}(n,\tau)$. Introducing the effective volume comes along with the assumption that the probability has the value 1 for finding a particle the emission of which is detected during the bin time $\tau$ in the volume defined by the fictitiously introduced effective volume $\tau V_{eff,j}(\tau)$. Correspondingly it is possible to summarize across all emissions being emitted from the volume $\tau V_{eff,j}(\tau)$ by normalizing the theoretical signal distribution $P_{sig}(n,\tau)$ to the volume $\tau V_{eff,j}(\tau)$ when introducing the effective volume in defining the theoretical signal distribution $P_{sig}(n,\tau)$. Such summarizing can e.g. be reduced to practice by local integration across the volume $\tau V_{eff,j}(\tau)$. The functional correlation by means of which such spatial local integration for determination of the theoretical signal distribution $P_{sig}(n,\tau)$ can be carried out can e.g. comprise the specific local detection rate $\mu_j(\vec{r})$, the local probability distribution and the local emission probability. Moreover the effective volume $V_{eff,j}(\tau)$ can be expressed as dependent on the population number $\omega_j(\tau)$, the concentration c, and the bin time $\tau$ by means of defining the mean population number $\omega_j(\tau)=c_j V_{eff,j}(\tau)\tau$, so that the effective volume $V_{eff,j}(\tau)$ can be reduced to values which can be established from the measurement data ascertained, that is the measurement value function. Introduction of the effective volume allows normalization to $\tau V_{eff,j}(\tau)$ of functions building $P_{sig}(n,\tau)$ or $P_{sig}(n,\tau)$, respectively, as e.g. the signal distribution for a single particle. According to the invention the consideration of the definition of $\tau V_{eff,j}(\vec{r})$ and the corresponding normalization of $P_{sig}(n,\tau)$ is a particularly advantageous embodiment, since the corresponding local integration can be carried out spatially unlimited without creating divergent expressions, whereby integration is simplified, $P_{sig}(n,\tau)$ can be expressed simpler so that the numerical fit can be carried out simpler and more exactly.

Introducing the effective volume $V_{eff,j}$ for a particle species j can thus be considered in defining the theoretical signal distribution $P_{sig}(n,\tau)$ by means of mathematical transformations sufficiently known to the skilled person. It is to be considered particularly that the effective volume $V_{eff,j}(\tau)$ is being introduced solely for the species j and that for each species a separate effective volume has to be introduced, as evident from the definition $\omega_j(\tau)=c_j V_{eff,j}(\tau)$. Correspondingly it can be advantageous and simpler for defining the theoretical signal distribution $P_{sig}(n,\tau)$ of the system first to determine the theoretical signal distributions $P_{sig}{}^{j}(n,\tau)$ for each species of particles assuming an effective volume $V_{eff,j}(\tau)$ for each species and then to determine the theoretical signal distribution $P_{sig}(n,\tau)$ of the system from these theoretical species signal distributions $P_{sig}{}^{j}(n,\tau)$.

Specifically a Poisson distribution can be assumed for the distribution of the population number, i.e. for the distribution of the number of particles of species j in the effective volume $V_{eff,j}(\tau)$. The probability of m particles of species j occupying the effective volume $V_{eff,j}(\tau)$ during the bin time $\tau$ can thus be given by the Poisson distribution $$Poi(m, \omega_j(\tau)) = \frac{\omega_j^m(\tau)}{m!}e^{-\omega_j(\tau)}.$$

In other embodiments other distributions can also be assumed depending on the system to be analyzed.

Specifically it can be assumed for determining the theoretical signal distribution $P_{sig}(n,\tau)$ that the local emission probability of the particles is distributed according to a Poisson distribution.

By assuming specific probability distributions, specifically by assuming a Poisson distribution of the population number in the effective volume and by assuming a Poisson distribution of the local emission probabilities, the formulation of the theoretical signal distribution $P_{sig}(n,\tau)$ can be further simplified. This may lead to a simple numerical fit and thus to simplification of the method according to the invention. These assumptions can be incorporated when defining the theoretical signal distribution $P_{sig}(n,\tau)$ by means of mathematical transformations sufficiently familiar to the skilled person.

In a particularly advantageous embodiment the bin time dependent mean value $\bar{n}(\tau)$ and the bin time dependent variance $\sigma^2(\tau)$ are determined for each bin time $\tau$ from the distribution functions $p_\tau(n)$, wherein the measuring value function is defined so as to include $\bar{n}(\tau)$ and $\sigma^2(\tau)$. The skilled person understands this as equivalent with determining the first moment $m_{1,\tau}{}^{Mess}$ and the second moment $m_{2,\tau}{}^{Mess}$ of the distribution function $p_\tau(n)$ for each bin time $\tau$ and then constituting the bin time dependent moment functions mess $m_1{}^{Mess}(\tau)$ and $m_2{}^{Mess}(\tau)$, since $\bar{n}(\tau)$ and $\sigma^2(\tau)$ can be calculated unambiguously from $m_1{}^{Mess}(\tau)$ and $m_2{}^{Mess}(\tau)$ and vice versa. Correspondingly defining the measurement value function as incorporating $m_i{}^{Mess}(\tau)$ means that the measurement value function comprises functions of $\tau$ which can be converted unambiguously into at least one $m_i{}^{Mess}(\tau)$ or into a function composed of several $m_i{}^{Mess}(\tau)$. According to the invention also such functions can be determined from $P_\tau(n)$ instead of $m_i{}^{Mess}(\tau)$. By defining the measurement value function so as to comprise $\bar{n}(\tau)$ and $\sigma^2(\tau)$ the expression of the measurement value function can be kept simple. Still it is guaranteed that the sufficiently precise determination of the relevant parameters is possible by means of numerical fit between the measurement value function and the theoretical signal function. This is based upon the finding that in $\bar{n}(\tau)$ and $\sigma^2(\tau)$ there is sufficient information for guaranteeing sufficiently exact quantification and characterizing of the particle in the system from the measurement data obtained during the measuring period.

In a particularly advantageous embodiment the measurement value function is established as $$Q(\tau) = \frac{\sigma(\tau)^2 - \bar{n}(\tau)}{\bar{n}(\tau)},$$

wherein the numerical fit is carried out by means of the relation $$Q(\tau) = \frac{\sigma(\tau)^2 - \bar{n}(\tau)}{\bar{n}(\tau)} = \frac{m_2^{sig}(\tau) - [m_1^{sig}(\tau)]^2 - m_1^{sig}(\tau)}{m_1^{sig}(\tau)},$$

and wherein $m_1^{sig}(\tau)$ represents the first moment and $m_2^{sig}(\tau)$ represents the second moment of $P_{sig}(n,\tau)$. As known the variance $\sigma^2(\tau)$ and the mean value can be determined from $m_1^{Mess}(\tau)$ and $m_2^{Mess}(\tau)$. This advantageous embodiment is based upon the finding that the numerical fit between the correspondingly defined measurement value function and the correspondingly defined theoretical signal function can be carried out particularly simple in a plurality of applications, that a very precise indication of the bin time independent parameters $\mu_{0,j}$, $c_j$ and $\theta_j$ is possible by the corresponding numerical fit with relative low effort, and that the evaluation of the obtained measurement data is possible with limited effort because of the limitation to considering the first and second moments of the theoretical signal function and the distribution functions $p_\tau(n)$. In one embodiment the numerical fit takes place based upon the measuring value function $Q(\tau)$, wherein the numerical fit is carried out by means of the relation $$\frac{Q(\tau)}{\tau} = \frac{m_2^{sig}(\tau) - (m_1^{sig}(\tau))^2 - m_1^{sig}(\tau)}{\tau * m_1^{sig}(\tau)}.$$

Such a numerical fit aims at fitting of the measurement detection rate with the detection rate expected from theory by introducing $\tau$ as divisor into the fit. This embodiment may enable carrying out a particularly simple numerical fit allowing determination of the constants with little calculating effort. In particular such fit can be specifically simplified by carrying out the fit with a limit value consideration at $$\lim_{\tau \to 0}$$

for both functions to be fitted.

In one embodiment the theoretical signal function is being defined as time-dependent by means of carrying out several measurements, each at a specific point in time assigned to the respective measurement. A bin time dependent measurement value function is determined for each of the measurements assigned to the respective specific point in time by approximating each measurement value function with an approximation graph, for example by numerical or graphical fit. From the approximation graph of each of the measurement value functions the value of the respective measurement value function is determined, which this measurement value function has for $$\lim_{Binzeit \to 0}.$$

Further, by limit consideration $$\lim_{Binzeit \to 0}$$

of the theoretical signal function, the values of the theoretical signal function at the specific points in time are ascertained which the theoretical signal function has at $$\lim_{Binzeit \to 0}.$$

The numerical fit is carried out by fitting the limit value of one of the measurement functions to the limit value of the theoretical signal function at a point in time assigned to this measurement value function. Thus in this embodiment measurements are carried out at different specific points in time and the measurement value function is determined for each measurement. The time span of the measuring period of each measurement is significantly lower than the time difference between one measurement and the measurements adjacent in time to this one. E.g. the measurement period for each one of the measurements can extend over the same time span. E.g. the time span between measurements can be constant for all measurements. E.g. the time span of the measuring period can be less than 10%, in particular less than 1% of the time distance of one measurement to the measurement or measurements next to this one. E.g. the time span of 5 seconds can be established for the measuring period of one measurement and the time distance to the next measurement to 5 minutes. In each case the start of the measuring period of the assigned measurement is determined by a specific point in time.

In the embodiment described here data sets are generated at each specific point in time by the explained variation of bin time and the measurement value function is determined from these data sets for the specific point in time. By determining the value of the measurement value function at a specific point in time, which the measurement value function takes if the bin time goes to 0, a particularly simple numerical fit is possible by means of the limit consideration of the theoretical signal function at the specific point in time with said determined value. The embodiment described is specifically suited for determining constants which characterize the particles in the system, at least some of which are varying with time and therefore have different values at different specific points in time. This can e.g. be true for the concentration of the particles in the system. The numerical fit can particularly simply be carried out by assuming that some of the constants from the theoretical signal function are constant over the time and others are variable with time. E.g. the concentrations of the particles in the system can be assumed as being variable with time and the brightness in emission of emittends by the particles can be assumed as constant with time. Numerical fit can be carried out particularly simply in the embodiment described by stipulating the measurement value function to be $$\frac{Q(\tau)}{\tau} = \frac{\sigma(\tau)^2 - \bar{n}}{\tau * \bar{n}(\tau)}$$

and the theoretical signal function to be $$\frac{m_2^{sig}(\tau) - [m_1^{sig}(\tau)]^2 - m_1^{sig}(\tau)}{\tau * m_1^{sig}(\tau)}.$$

Thus a particularly simple limit consideration for $\tau \to 0$ can be carried out whereby the limit values or limes values, respectively, of the measurement value function or the theoretical signal function, respectively, can be ascertained.

In a further advantageous embodiment of the method according to the invention a mean local detection rate $\mu_{1,j}$ of the species j is established by means of the integral $$\bar{\mu}_{1,j} = \int_R d^3 r \mu_j(\vec{r})$$

over the in particular unlimited space R in defining the theoretical signal distribution $P_{sig}$ (n,$\tau$) and is introduced into the theoretical signal distribution $P_{sig}$ (n,$\tau$) as parameter independent on bin time. This space R can e.g. be the measuring volume. If the local probability distribution is appropriately selected the space can be e.g. unlimited. The mean local detection rate $\bar{\mu}_{1,j}$ is herein a constant independent on bin time. Because of the relation $\mu_j(\vec{r}) = \mu_{0,j} f(\vec{r})$ the characteristic detection brightness $\mu_{0,j}$ is contained in $\bar{\mu}_{1,j}$. By introducing $\bar{\mu}_{1,j}$ in the theoretical signal distribution $P_{sig}$ (n,$\tau$) the constant $\bar{\mu}_{1,j}$ referring to the parameter $\mu_{0,j}$ can thus be ascertained in the numerical fit between the theoretical signal function and the measuring value function. The mean local detection rate $\bar{\mu}_{1,j}$ corresponds per definition to the detection rate of a hypothetical particle of species j, which can be determined by means of the detector used in the measurement; said particle of species j emits emittends at any point in time during the measurement with its particle specific characteristic rate summarized over the spatial volume. The invention is based upon the finding that by introducing the mean local detection rate $\bar{\mu}_{1,j}$ the formulation of the theoretical signal distribution $\bar{\mu}_{1,j}$ can be highly simplified. This allows for a simpler numerical fit between measuring value function and theoretical signal function. In case of applying the method according to invention to assist in having s different species of particles a corresponding mean local detection rate $\bar{\mu}_{1,s}$ can be established for each of the s species. The advantageous embodiment is based upon the approach of simplifying the expression for the theoretical signal distribution by replacing the location dependent function $\mu_j(\vec{r})$ with a spatially summarizing consideration by a constant $\bar{\mu}_{1,j}$ depending on bin time which can be determined by numerical fit in accordance with the method of the invention and comprises the constant $\mu_{0,j}$.

A further advantageous embodiment is characterized in that in applying the method according to the invention to the stochastic transport of the particles for defining the theoretical signal distribution $P_{sig}$(n,$\tau$) shifts and mean detected number of emissions of an individual particle of the species j is established to be $$\phi_{1,j}(\tau) = \frac{\int_0^\tau dt \int_R d^3 r_0 \left( \int_R d^3 r \mu_j(\vec{r}) \psi_j(\vec{r}, t \mid \vec{r}_0) \right)^2}{\int_R d^3 \mu_j(\vec{r})}.$$

In applying the method to deterministic transport of the particles a mean detected number of emissions of an individual particle of species j is established to be $$\phi_{1,j}(\tau) = \frac{\int_R d^3 r_0 \left( \int_0^\tau dt \int_R d^3 r \mu_j(\vec{r}) \psi_j(\vec{r}, t \mid \vec{r}_0) \right)^2}{\int_R d^3 r \mu_j(\vec{r})}.$$

Herein R can represent a distinct space, e.g. a limited measuring volume or e.g. an unlimited space, in each case depending on the approach in defining the theoretical signal distribution $P_{sig}$ (n,$\tau$). In particular integration over an unlimited space can grant advantages, since the integrals are simpler executable analytically. E.g. integration can be carried out over an unlimited space if the bin time dependent fictitious effective volume as explained above is introduced for defining $P_{sig}$ (n,$\tau$) for the measuring volume V being used and is considered correspondingly in the definition.

Introducing the mean detected number of emissions $\phi_{1,j}$ ($\tau$) allows a still further simplification in defining the theoretical signal distribution $P_{sig}$(n,$\tau$). By means of $\phi_{1,j}(\tau)$ the theoretical signal distribution $P_{sig}$ (n,$\tau$) can immediately be formulated in a simple manner assuming a specific distribution of the emission events for particles of species j. The distribution to be selected for that purpose depends on the nature of the particles of species j and on the emittends to be emitted. A binomial distribution, a Gaussian distribution or a Poisson distribution can e.g. be assumed depending on the application area of the method according to the invention. When applying said embodiment to a system with only one species j emitting emittends, defining the theoretical signal distribution $P_{sig}$ (n,$\tau$) is particularly simple. The method can however in a similar way be applied also to systems having s different species of emitting particles.

Assuming a Poisson distribution of the emission evidence of the species j it can e.g. be formulated:

$$Poi(n, \phi_{1,j})(\tau) = \frac{\phi_{1,j}^n(\tau)}{n!} e^{-\phi_{1,j}(\tau)}$$

for n=0, 1, . . . .

In one embodiment $$Q(\tau) = \frac{\sigma^2(\tau) - \bar{n}(\tau)}{\bar{n}(\tau)}$$

is assumed as measurement value function for the numerical fit, wherein $\sigma^2$ ($\tau$) and $\bar{n}(\tau)$ can be determined in a conventional manner and the numerical fit is carried out by the relation $$Q(\tau) = \frac{\sum_{j=1}^s \bar{\mu}_{1,j} c_j \phi_{1,j}(\tau)}{\lambda + \sum_{j=1}^s \bar{\mu}_{1,j} c_j}.$$

The method according to the invention is here applied to a system having s different particle species and the noise performance of the measuring apparatus is considered by means of the noise constant λ. Utilizing this functional expression the numerical fit can be carried out immediately and simply, if an appropriate $\phi_{1,j}(\tau)$ for the particles of species j for each of the s different particle species is being inserted. Thus in this embodiment the expression $$\frac{\sum_{j=1}^{s} \overline{\mu}_{1,j} c_j \phi_{1,j}(\tau)}{\lambda + \sum_{j=1}^{s} \overline{\mu}_{1,j} c_j}$$

is defined as theoretical signal function. The embodiment is based upon the assumptions according to the invention as already explained for defining the theoretical signal distribution. The functional correlation between measurement value function and theoretical signal function as applied for performing the numerical fit is based upon conventional mathematical transformations besides of the assumptions according to the invention which are introduced in this embodiment of the invention in order to formulate the expression for the numerical fit as simple as possible. It has been found that a particularly simple, fast, and precise determination of the constants relating to the bin time independent parameters $\mu_{0,j}$, $\theta_j$ and in particular $c_j$ is possible using the above-mentioned functional correlation between measurement value function and theoretical signal function. In particular it has proven to be especially advantageous to introduce the definition of the effective volume in addition to the definition of $P_{sig}(n,\tau)$ the present embodiment is based upon, and to carry out the integration over the unlimited space in analogy to the determination of $\overline{\mu}_{1,j}$. Thus characteristic properties of the particles like the diffusion constant of particles or the decay time of particles and the concentration of one particle species can be determined simply and precisely by numerical fit.

In particular when applying the method to a system having only one particular species j being the only species emitting emittends the numerical fit can be carried out by the relation $Q(\tau) = \phi_{1,j}(\tau)$. This allows a specifically simple determination of the constants relating to the bin time independent parameters $\mu_{0,j}$, $\theta_j$ and in particular $c_j$.

In one embodiment a Gaussian function $$\mu_j(\vec{r}) = \mu_{0,j} \exp\left(-\frac{2}{a_{xy}^2}(x^2 + y^2)\right) \exp\left(-\frac{2}{a_z^2} z^2\right)$$

with the constants $a_{xy}$ and $a_z$ is assumed as local detection rate. Thus the local dependency of the local detection rate $\mu_j(\vec{r})$ is represented by a Gaussian function. The equation given for $\mu_j(\vec{r})$ is one option to represent $\mu_j(\vec{r})$ for the definition of the theoretical signal distribution $P_{sig}(n,\tau)$. x, y and z are the local coordinates of the spatial vector $\vec{r}$. Assuming a corresponding local dependency of $\mu_j(\vec{r})$ is e.g. an approximation yielding very good results for the method according to the invention in case of applying the method according to the invention to a system where the particles to be analyzed emit photons as emittends and are stimulated to emit by 1-photon stimulation. Depending on the area of application other local dependencies can also be assumed for defining $P_{sig}(n,\tau)$. E.g. corresponding known dependencies of the emission can be applied in the case of applying the method to a system with particles emitting photons and being stimulated by two-photon-stimulation and for applying the method to a measurement with STED microscopy.

In one embodiment of the method according to the invention for applying the method to a system where the particles to be analyzed are subject to a fluidic transport with transport velocity v, a mean detected emission number of a single particle of species j is stipulated to be $$\phi_{1,j}(\tau) = \frac{\sqrt{\pi}}{2\sqrt{2}} \frac{\mu_{0,j}}{2a} \frac{\vartheta_j^2}{\tau} \int_{-\infty}^{\infty} dz_0 \left( \text{erf}\left[\frac{1}{\vartheta_j}\left(\frac{z_0}{v} + \tau\right)\right] - \text{erf}\left[\frac{z_0}{v\vartheta_j}\right] \right)^2$$

for defining the theoretical signal distribution $P_{sig}(n,\tau)$. Herein $\theta_j$, a and v are constants dependent on bin time. The decay time can be expressed by $$\vartheta_j = \frac{a}{\sqrt{2v}}$$

dependent on v and a. In this sense $\theta_j$ indicates the time reduced by $\sqrt{2}$ in which one particle travels along distance a in the direction of transport. E.g. in this case the decay time $\theta_j$ can be construed as being a time which characterizes the time span during which one particle of species j is present within the volume where the particle is able to emit emittends in such a manner that they can be detected by a detector. Distance a can be determined e.g. by the lens system of the measuring apparatus which projects the emittends from the measuring volume to the detector. E.g. $\theta_j$ allows characterizing the transport properties of particles of species j in the system.

In one embodiment of the method according to the invention for applying the method to a system wherein the particles to be analyzed are subject to a diffusion transport having spherical measurement symmetry, that means that the local dependency of the local detection rate in the measurement volume has spherical symmetry, the mean detected emission number of a single particle z of the species j is stipulated to be $$\phi_{1,j}(\tau) = \frac{\mu_{0,j}}{\sqrt{2}} \vartheta_j \left(1 - \frac{1}{\sqrt{1 + \frac{\tau}{\vartheta_j}}}\right)$$

for defining the theoretical signal distribution $P_{sig}(n,\tau)$. The diffusion transport can e.g. be construed as an isotropic decay of particles which are able to emit emittends during the measurement before the decay and can no longer emit emittends after the decay. E.g. the diffusion transport can be construed as a mass transport by diffusion of particles wherein emittends from the particles can be detected only when they are located in a specific measurement volume. Depending on the application of the method according to the invention a corresponding interpretation of the diffusion transport and correspondingly an interpretation of $\theta_j$ based upon the application is required. In the first example given above $\theta_j$ can e.g. indicate the time for decay of particles of species j. In the second example $\theta_j$ can characterize the time needed by particles of species j to travel across the measurement volume. In this case $\theta_j$ can e.g. be described by $$\vartheta_j = \frac{a^2}{8D_j}$$

for a measurement volume of spherical symmetry, wherein a is the diameter of the measurement volume and $D_j$ is the diffusion constant $D_j$ of particles of species j in the system.

In one embodiment of the method according to the invention for applying the method to a system wherein the particles to be analyzed are subject to a diffusion transport having spheroidal [ellipsoidal] measurement symmetry, that means that a spheroidal symmetry of the local dependency of the local detection rate is established in the measurement volume, the mean detected emission number of a single particle z of the species j can be stipulated to be $$\phi_{1,j}(\tau) = \frac{\mu_{0,j}}{2^{\frac{3}{2}}} \int_0^\tau \frac{dt}{\left(1 + \frac{t}{\vartheta_{j,xy}}\right)\sqrt{1 + \frac{t}{\vartheta_{j,z}}}}$$

for defining the theoretical signal distribution $P_{sig}$ (n,τ). Herein $\theta_{j,xy}$ and $\theta_{j,z}$, are decay times for particles of species j which are included in decay time $\theta_j$. As explained above the diffusion transport can be interpreted differently depending on the application of the method. If the diffusion transport is construed as a real mass transport of the particles in the system to be analyzed as explained above, $\theta_{j,xy}$ and $\theta_{j,z}$ can be described by $$\vartheta_{j,xy} = \frac{a_{xy}^2}{8D_j} \text{ and } \vartheta_{j,z} = \frac{a_z^2}{8D_j}$$

in case of spheroidal symmetry of the spatial dependency of detection rate in the measurement volume, wherein $a_{xy}$ and $a_z$ are correspondingly constants describing the measurement volume and $D_j$ is the diffusion constant of particles of species j in the system.

Hereinafter the invention will be described in detail on the basis of illustrative embodiments and with reference to FIGS. 1 through 11:

In the figures

FIGS. 8a-8d are graphic representations of the results of the numerical fit according to still another embodiment of the invention.

Figure 1:
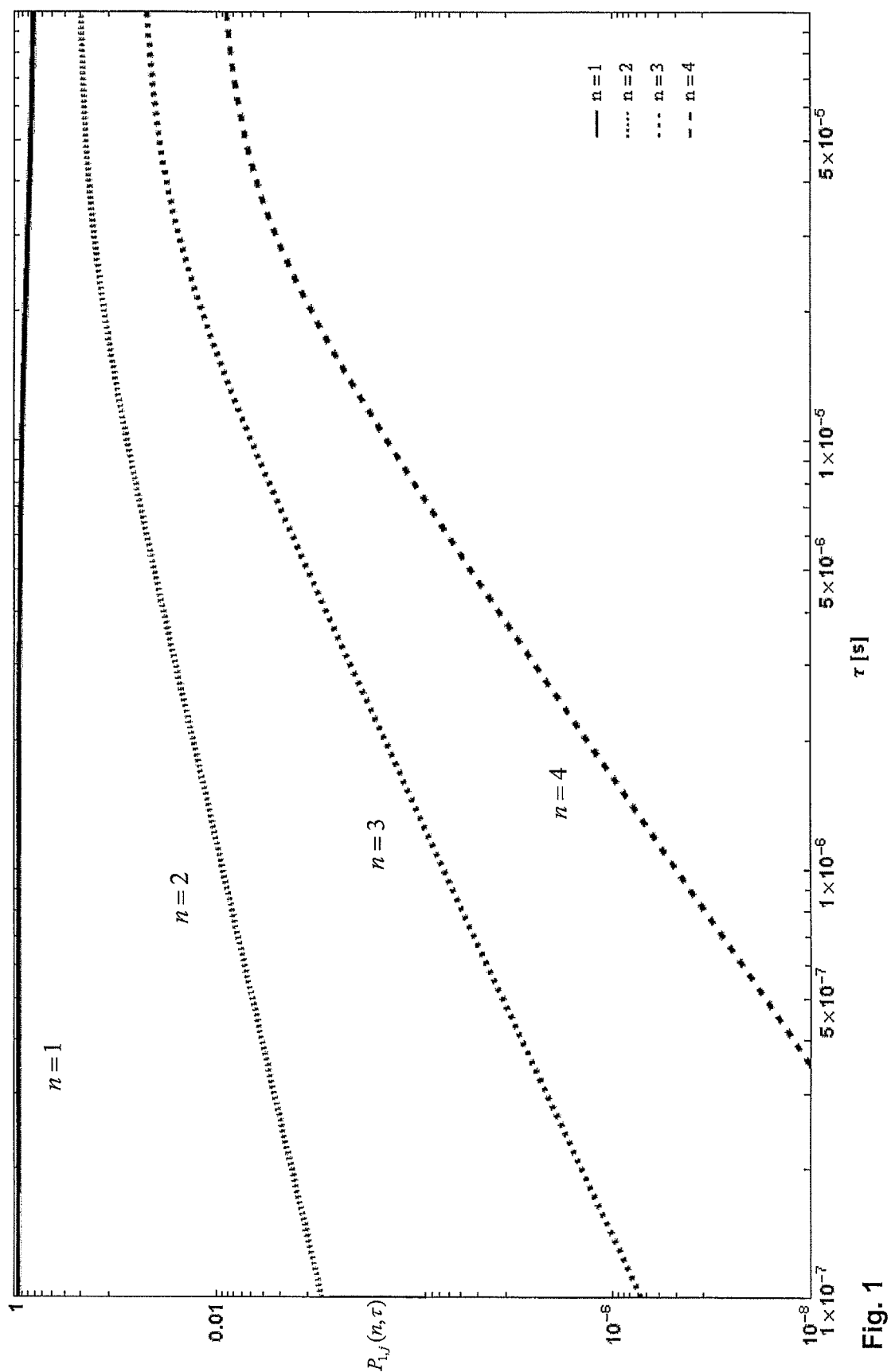
FIG. 1 is the distribution of individual molecules assumed for determination of $P_{sig}(n,\tau)$ in an illustrative embodiment.

As explained the skilled person is able to define a theoretical signal distribution $P_{sig}(n,\tau)$ using conventional mathematic, analytic and numeric means, which then allows to determine according to the method of the invention the data specifying the system or the particles, resp., by numerical fit. By means of an illustrative embodiment it is shown hereinafter in an exemplary manner how the skilled person can define a theoretical signal function $P_{sig}(n,\tau)$ by means of the assumptions according to the invention. It is assumed for applying the method to a system where particles are to be analyzed; the local probability and local emission probability of which can be approximated by a Poisson distribution.

In the embodiment according to the invention the above explained definition of the effective volume $V_{\mathit{eff},j}(\tau)$ is being applied. Further the above explained mean detected emission number of a single particle of species j $\phi_{1,j}(\tau)$ is being introduced in order to simplify the formulation of $P_{sig}$ (n,τ).

Already normalizing the Poisson distribution allows writing $$\sum_{n=0}^{\infty} Poi(n, \phi_{1,j}(\tau)) = 1.$$

By means of $$Poi(n, \phi_{1,j}(\tau)) = \frac{\phi_{1,j}^n}{n!} e^{-\phi_{1,j}(\tau)}$$

this expression can be transformed to become:

$$\sum_{n=1}^{\infty} Poi(n, \phi_{1,j}(\tau)) = 1 - e^{-\phi_{1,j}(\tau)}.$$

By means of mathematical transformation by multiplying the equation with the factor $$\frac{\overline{\mu}_{1,j}}{\phi_{1,j}}(\tau)$$

is obtained $$\frac{\left(\int_{R^3} d^3 r_0 \mu_j(\vec{r})\right)}{\phi_{1,j}(\tau)} \sum_{n=1}^{\infty} Poi(n, \phi_{1,j}(\tau)) =$$

$$\sum_{n=1}^{\infty} \frac{\left(\int_{R^3} d^3 r_0 \mu_j(\vec{r})\right)}{n!} \phi_{1,j}(\tau)^{n-1} e^{-\phi_{1,j}(\tau)} = \left(\int_{R^3} d^3 r_0 \mu_j(\vec{r})\right) \frac{(1 - e^{-\phi_{1,j}(\tau)})}{\phi_{1,j}(\tau)}.$$

Applying these transformations allows formulating an expression, the volume integral of which exists for its summands. In particular it is possible to develop the term $$\frac{1 - e^{\phi_{1,j}(\tau)}}{\phi_{1,j}(\tau)}$$

into a series. It is assumed according to the invention that the integration can be incorporated into the sum. For simplification the expression $$\left(\int_{R^3} d^3 r_0 \mu_j(\vec{r})\right) \frac{1 - e^{-\phi_{1,j}(\tau)}}{\phi_{1,j}(\tau)}$$

can be abbreviated. Here this expression can be defined as effective volume so that $$V_{eff,j}(\tau) := \left(\int_{R^3} d^3 r_0 \mu_j(\vec{r})\right) \frac{1 - e^{-\phi_{1,j}(\tau)}}{\phi_{1,j}(\tau)} = \overline{\mu}_{1,j} \frac{1 - e^{-\phi_{1,j}(\tau)}}{\phi_{1,j}(\tau)}.$$

Thus applies:

$$\sum_{n=1}^{\infty} \frac{\overline{\mu}_{1,j}}{V_{eff,j}(\tau)} \frac{\phi_{1,j}(\tau)^{n-1}}{n!} e^{-\phi_{1,j}(\tau)} = 1.$$

By means of defining the effective volume, according to which each particle being present in the volume $\tau V_{eff,j}(\tau)$ emits an emittend being detected, which means that the probability not to emit is for a particle being located in that volume equal to 0. Thus the signal distribution of an individual particle of species j is:

$$P_{1,j}(n, \tau) := \begin{cases} 0 & \text{for } n = 0 \\ \frac{\overline{\mu}_{1,j}}{V_{eff,j}(\tau)} \frac{\phi_{1,j}(\tau)^{n-1}}{n!} e^{-\phi_{1,j}(\tau)} & \text{for } n > 0 \end{cases}$$

Because of the normalization characteristics of the Poisson distribution due to the effective volume this signal distribution of an individual particle automatically shows the correct normalization behavior. The probabilities yielding from the distribution of one individually particle of species j as a function of the bin time τ for n=1, 2 and 3 are shown in FIG. 1. As expected it follows:

$$\lim_{\tau \to 0} P_{1,j}(n=1, \tau) = 1 \text{ and } \lim_{\tau \to 0} P_{1,j}(n \geq 1, \tau) = 0.$$

This is because each particle being located in the volume defined by means of the effective volume emits at least one detected emittend and for $$\lim_{\tau \to 0},$$

that is for a bin time approaching 0, a particle cannot emit two emittends. A decrease of probability $P_{1,j}(n=1,\tau)$ is observed with increasing bin time τ to the extent of increase of probabilities $P_{1,j}(n\geq1,\tau)$. This can be immediately understood intuitively, since it can be expected at increasing bin time τ that several emittends being emitted by one particle will be detected also. The individual probabilities show a stationary behavior at very long bin times. This relates to the effect that particles will travel out of the measurement volume with increasing bin time or can no longer emit further emittends for other reasons, e.g. because of decay.

If at time $t_0$ an emittend of a particle is detected, according to the definition of the effective volume $V_{eff,j}(\tau)$ introduced in the illustrative embodiment it occupies the volume $\tau V_{eff,j}(\tau)$. Thus the number m of particles occupying the volume $\tau V_{eff,j}(\tau)$ during bin time τ is by itself a stochastic process. According to the definition of $V_{eff,j}(\tau)$ one obtains $\omega_j(\tau) = c_j V_{eff,j}(\tau)\tau$. The occupation probability $\chi_j(m,\omega_j(\tau))$ can thus be indicated in the illustrative embodiment described assuming a Poisson distribution for the occupation density $$\chi \text{ as } \chi_j(m, \omega_j(\tau)) = \frac{\omega_j^m(\tau)}{m!} e^{-\omega_j(\tau)}.$$

As explained the skilled person can achieve the distribution $P_{1,j}(n,\tau)$ in a simple manner from the assumptions according to the invention by means of mathematical transformations and simplifications. $P_{1,j}(n,\tau)$ indicates the probability to detect n emissions from one individual particle of species j being located in the fictitious volume $\tau V_{eff,j}(\tau)$ within a bin time τ. A corresponding $P_{1,j}(n,\tau)$ can for example be determined in the same way as in the illustrative embodiment shown. Of course other mathematical transformations and simplifications are also possible, however, in order to obtain an expression for $P_{1,j}(n,\tau)$ as simple as possible and still as exact as possible.

In the described illustrative embodiment of the method according to the invention the theoretical signal distribution $P_{sig}(n,\tau)$ is being determined by means of determining $P_{1,j}(n,\tau)$ as an auxiliary value. Of course other approaches to determine $P_{sig}(n,\tau)$ are also possible. In the illustrative embodiment described $P_{sig}(n,\tau)$ is defined through $P_{sig}(n,\tau)$ by means of the assumption that in the system observed m particles being able to emit emittends during the measurement are present in the volume $\tau V_{eff,j}(\tau)$ out of which the particles can emit detectable emittends. Given the stochastic independency of the emission processes of the m different particles in the volume $\tau V_{eff,j}(\tau)$ the distribution of the number of emissions detected from the m particles can be represented by the m-fold convolution $$P_{m,j}(n, \tau) = (P_{m-1,j} \otimes P_{1,j})(n, \tau) = \sum_{i=1}^{n-1} P_{m-1,j}(n-i, \tau) P_{1,j}(n, \tau)$$

wherein m>1. Correspondingly the theoretical signal distribution $P_{sig,m}(n>0,\tau)$ indicating the signal distribution, wherein it is assumed that m particles are in the volume $\tau V_{eff,j}(\tau)$ and that at least one photon is detected, can be indicated as:

$$P_{sig,m}(N > 0, \tau) = \begin{cases} P_{1,j}(n, \tau) & \text{for } m = 1 \\ P_{m,j}(n, \tau) & \text{for } m > 1 \end{cases}$$

For a complete representation of $P_{sig}(n,\tau)$ it has to be considered that the number m of particles being located in the volume determined by the effective volume and therefore contributing to the number of emissions detected during bin time, is a statistical value and that a specific probability distribution has to be assumed for this value. As mentioned above the mean occupation number, that is the mean value for m, can be indicated by $\omega_j(\tau)=c_j V_{eff,j}(\tau)\tau$. A selection of a known probability distribution must be performed in order to establish the probability distribution of the occupation number based upon the behavior of the particles in the system to be analyzed. In the illustrative embodiment described a Poisson distribution of the occupation number is assumed. Therefore applies $$\chi_j(m, \omega_j(\tau)) = \frac{\omega_j^m(\tau)}{m!} e^{-\omega_j(\tau)}$$

for the probability distribution of the occupation number m for particles of species j.

This way the theoretical signal distribution for a system with just one particle species j emitting emittends can be defined by $$P_{sig}(n > 0, \tau) = \sum_{m=1}^{\infty} P_{sig,m}(n > 0, \tau) \frac{\omega_j^m(\tau)}{m!} e^{-\omega_j(\tau)}.$$

Further the value of $P_{sig}$ (n=0,$\tau$) has to be determined in order to completely describe the theoretical signal distribution $P_{sig}$ (n,$\tau$). According to the definition of the effective volume the probability that during the measuring period no emittend is detected and thus n=0 is identical with the probability that there is no emitting particle present in the volume $\tau V_{eff,j}(\tau)$ during the measuring period. Thus $P_{sig}$ (n=0,$\tau$)=$e^{-\omega_j(\tau)}$ applies. Therewith applies $$P_{sig}(n, \tau) = \begin{cases} e^{-\omega_j(\tau)} & \text{for } n = 0 \\ \sum_{m=1}^{\infty} P_{sig,m}(n > 0, \tau) \frac{\omega_j(\tau)^m}{m!} e^{-\omega_j(\tau)} & \text{for } n > 0 \end{cases}$$

As is obvious from the illustrative embodiment described, introduction of the effective volume in defining the theoretical signal distribution $P_{sig}$ (n,$\tau$) significantly facilitates the mathematical transformations when aiming at an expression $P_{sig}$ (n,$\tau$) by means of the assumptions according to the invention.

This expression for the theoretical signal distribution $P_{sig}$ (n,$\tau$) can be transformed by means of the probability generating function into a recursion formula:

$$P_{sig}(n, \tau) = \begin{cases} -\omega_j(\tau) & \text{for } n = 0 \\ \frac{\omega_j(\tau)}{n} \sum_{k=1}^{n} k P_{1,j}(k, \tau) P_{sig}(n-k, \tau) & \text{for } n > 0 \end{cases}$$

By way of example the values of $P_{sig}(n,\tau)$ for n=0, 1, 2 and 3 can be calculated as follows:

$$P_{sig}(0, \tau) = e^{-\omega_j(\tau)}$$

$$P_{sig}(1, \tau) = e^{-\omega_j(\tau)} \omega_j(\tau) P_{1,j}(1, \tau)$$

$$P_{sig}(2, \tau) = e^{-\omega_j(\tau)} \left( \frac{\omega_j^2(\tau)}{2} P_{1,j}^2(1, \tau) + \omega_j(\tau) P_{1,j}(2, \tau) \right)$$

$$P_{sig}(3, \tau) = e^{-\omega_j(\tau)} \left( \frac{\omega_j^3(\tau)}{6} P_{1,j}^3(1, \tau) + \omega_j^2(\tau) P_{1,j}(1, \tau) P_{1,j}(2, \tau) + \omega_j(\tau) P_{1,j}(3, \tau) \right)$$

Thus $P_{sig}$ (n,$\tau$) represents the sum of the combinatorial possibilities to detect n emittends, wherein the contribution of the signal distribution for emittends emitted by just one particle is weighted with the corresponding product of the occupation number in each case.

Figure 2:
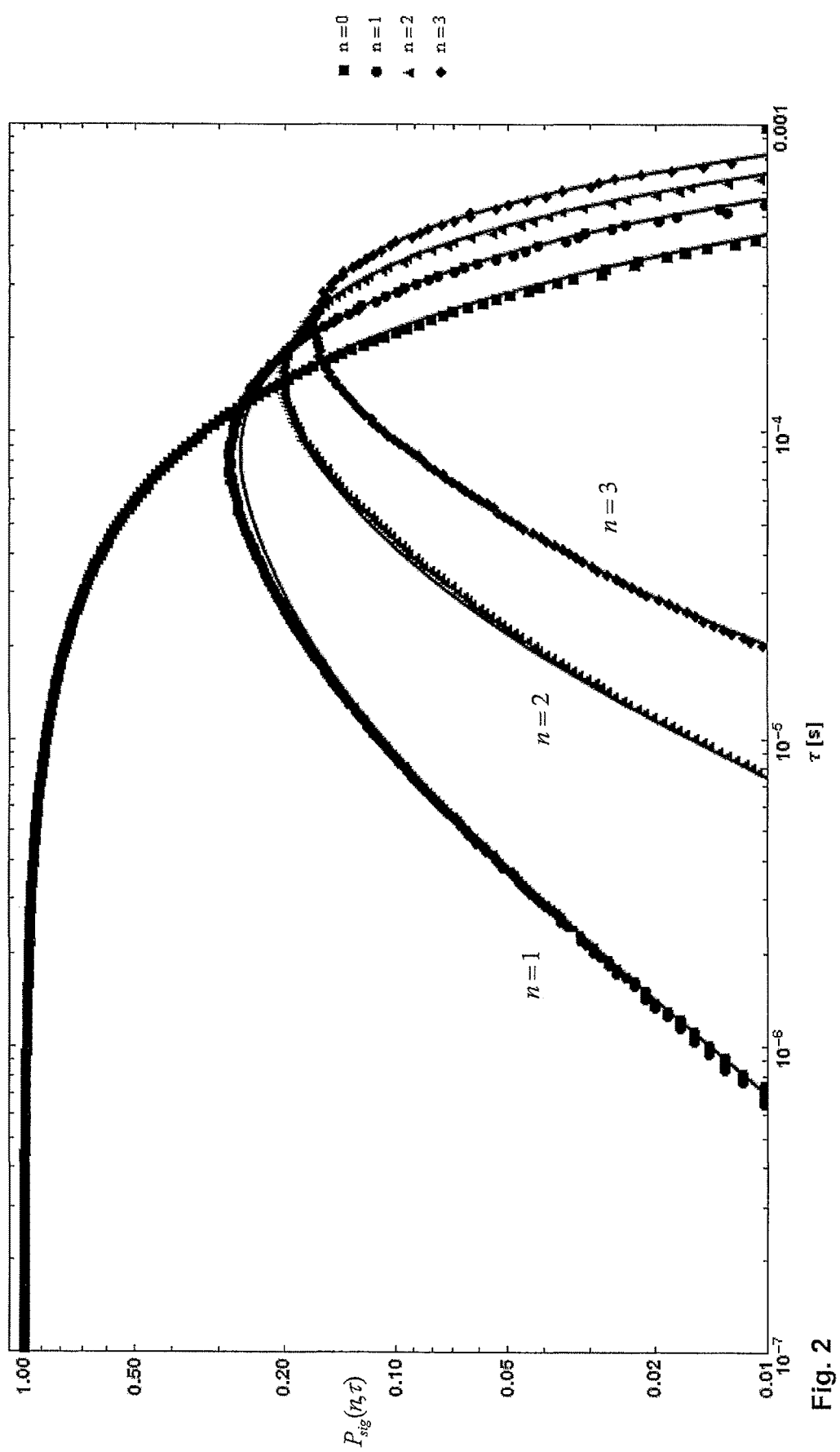
FIG. 2 is the theoretical signal distribution $P_{sig}(n,\tau)$ as function of bin time for different values of n as determined according to one embodiment.

In FIG. 2 $P_{sig}$ (n,$\tau$) for n=0, 1, 2 and 3 is shown graphically as dependent on $\tau$. From FIG. 2 it is apparent that the probability to detect more emittends increases with increasing bin time. Correspondingly it is apparent from FIG. 2 that the theoretical signal distribution $P_{sig}$ (n,$\tau$) corresponds to the measurement results expected.

From the recursion formula mentioned above for $P_{sig}$ (n,$\tau$) the moments $m_i^{sig}(\tau)$ of $P_{sig}(n,\tau)$ can be determined in conventional manner. Such conventional determination of the moments $m_i^{sig}(\tau)$ is e.g. described in the dissertation "Die Einzelmolekülverteilung in Fluoreszenz-Fluktuations-Experimenten" ["The distribution of single molecules in fluorescence fluctuation experiments"], B. Greiner, Dortmund, 2007. Since the theoretical signal distribution $P_{sig}$(n,$\tau$) is normalized to 1 like any probability distribution, the 0 th moment is obtained as:

$$m_0^{sig}(\tau) = \sum_{n=0}^{\infty} P_{sig}(n, \tau) = 1.$$

By means of conventional calculation the further moments are obtained as:

$$m_k^{sig} = \sum_{n=0}^{\infty} n^k P_{sig}(n, \tau) = \omega_j(\tau) \sum_{l=1}^{k} \binom{k-1}{l-1} m_{k-l}^{sig} m_{l,j}^1,$$

wherein $m_{1,j}^1$ is the l-th moment of the signal distribution for a single particle of species j.

The moments $m_{k,j}^1$ can be calculated by means of the characteristic function $\varphi(t)$ of the signal distribution of a single particle of species j, $P_{1,j}(n,\tau)$, wherein the conventional definition of $\varphi(t)$ and conventional mathematical transformations can be applied. With $$\varphi(t) = \sum_{n=0}^{\infty} P_{1,j}(n, \tau) e^{int} \text{ and}$$

$$P_{1,j}(n, \tau) := \begin{cases} \sum_{n=1}^{\infty} \frac{\bar{\mu}_{1,j}}{V_{eff,j}(\tau)} \frac{\phi_{1,j}(\tau)^{n-1}}{n!} e^{-\phi_{1,j}(\tau)} = 1 & \text{for } n = 0 \\ & \text{for } n > 0 \end{cases}$$

results $\varphi(t) = \frac{\bar{\mu}_{1,j}}{V_{eff,j}(\tau)} \frac{e^{-\phi_{1,j}(\tau)}}{\phi_{1,j}(\tau)} \left( e^{\phi_{1,j}(\tau) e^{it}} - 1 \right).$ As known, from the characteristic functions the moments $m_{k,j}^1$ for any order k can be calculated through:

$$m_{k,j}^1 = \frac{1}{i^k}\frac{d^k}{dt^k}\varphi(t)\bigg|_{t=0} = \frac{\bar{\mu}_{1,j}}{V_{e\!f\!f,j}(\tau)}\frac{e^{-\phi_{1,j}(\tau)}}{\phi_{1,j}(\tau)}\frac{1}{i^k}\frac{d^k}{dt^k}(e^{\phi_{1,j}(\tau)e^{it}}-1) = \frac{\bar{\mu}_{1,j}}{V_{e\!f\!f,j}(\tau)}\left(\sum_{l=1}^{k}S(k,l)\phi_{1,j}^{l-1}(\tau)\right),$$

wherein S(k,l) represent constant coefficients, that are Stirling numbers of second kind as occurring frequently with combinatorial problems. They describe the number of different options for partitioning a permutation of k elements into l cycles.

Taking into account the moments $m_{k,j}^1$ determined this way, the k-th moments $m_k^{sig}$ can be shown to be:

$$m_k^{sig} = \omega_j(\tau)\sum_{l=1}^{k}\sum_{v=1}^{l}\binom{k-1}{l-1}S(l,v)\frac{\phi_{1,j}^v(\tau)}{1-e^{-\phi_{1,j}(\tau)}}m_{k-1}^{sig}.$$

From this expression all moments can be calculated. E.g. the first and second moments can be indicated as $$m_1^{sig}=c_j\bar{\mu}_{1,j}\tau$$

$$m_2^{sig}=c_j\bar{\mu}_{1,j}\tau(1+c_j\bar{\mu}_{1,j}\tau+\phi_{1,j}(\tau)).$$

As known, mean value $\bar{n}$ and variance $\sigma^2$ can be calculated by $$\bar{n}_{sig}=m_1^{sig}=c_j\bar{\mu}_{1,j}\tau$$

$$\sigma_{sig}^2=m_2^{sig}-m_1^{sig^2}=c_j\bar{\mu}_{1,j}\tau(1+\phi_{1,j}(\tau)).$$

This result is in conformity with the expectations for the signal distribution of a system with only one species of particles j. The mean value of the signal distribution corresponds to the rate of a single particle of species j summed up over the whole volume and multiplied with bin time $\tau$ and particle density $c_j$. The variance deviates from the expected value by a factor of $1+\phi_{1,j}$, so that the signal distribution is not a Poisson distribution.

The theoretical signal function can e.g. be determined from $\bar{n}_{sig}$ and $\sigma_{sig}^2$ by means of the definition of the theoretical signal function through $Q_{sig}$ with $$Q_{sig} = \frac{\sigma_{sig}^2-\bar{n}_{sig}}{\bar{n}_{sig}} = \frac{m_{2,j}^{sig}-[m_{1,j}^{sig}]^2-m_{1,j}^{sig}}{m_{1,j}^{sig}} = \phi_{1,j}(\tau).$$

This theoretical signal function defined as $Q_{sig}$ is identical to the well-known Mandel Q-factor. By means of the definition of $\phi_{1,j}(\tau)$ as introduced with the illustrative embodiment described above the numerical fit for determining the constants characterizing the particles, in particular determining $\theta_j$, $c_j$ and $\mu_{0,j}$ or $\bar{\mu}_{1,j}$, respectively, can be immediately determined with a corresponding measurement value function.

$P_{sig}$ (n,$\tau$) as well as the moments $m_i^{Mess}(\tau)$ can be determined under the assumptions according to the invention, as explained with the illustrative embodiment shown and a theoretical signal function for the numerical fit can be formulated. In the illustrative embodiment shown above this has been carried out by way of example for a system where just one species of emitting particles j is expected. Of course other mathematical transformations and intermediate assumptions or intermediate definitions, respectively, are possible in order to arrive at an expression for $P_{sig}$ (n,$\tau$) as well as $m_i^{sig}(\tau)$.

According to a further illustrative embodiment of the invention the definition in accordance with the illustrative embodiment for a system having only one particle species j as mentioned above can be applied in an analogous manner for defining $P_{sig}$ (n,$\tau$) for a system having s different particle species. Several methods of calculation can be applied for this purpose. In the present illustrative embodiment it is simplifying assumed that the particles of the different species can diffuse within the system freely and unaffectedly, and that the number n of emittends detected within a time period is composed of the contributions $n_l$ originating from particles of the s different species. Correspondingly n can be represented by $$n = \sum_{l=1}^{s}n_l + n_{noise},$$

wherein $n_{noise}$ takes in account detection events originating from noise of the measuring apparatus. Noise can e.g. be detector noise and/or noise induced by a source of stimulation. In the illustrative embodiment it is assumed that a probability according to the species signal distribution for the species l $P_{sig}^l(n,\tau)$ can be indicated for each number $n_l$. Provided stochastic independency one can obtain the mix probability of the system having s different particle species can be shown by means of an s-fold convolution of the s different signal distributions $P_{sig}^l(n,\tau)$ as:

$$P_{sig}(n,\tau)=(P_{sig}^1\otimes\ldots\otimes P_{sig}^s\otimes P_{noise})(n,\tau).$$

In a first illustrative embodiment the noise performance and thus the contribution $n_{noise}$ is neglected so that $P_{sig}(n,\tau)$ can be defined by s-fold convolution of the species signal distributions $P_{sig}^1(n,\tau)$.

The same calculation methods can be applied in calculating $P_{sig}(n,\tau)$ in the present illustrative embodiment as explained in the first illustrative embodiment relating to a system having only one particle species j. Herein a recursive expression for $P_{sig}$ (n>0,$\tau$) can be indicated by means of the probability generating function $\varphi(t)$ in an analogous way, while the probability $P_{sig}(n=0,\tau)$ can be calculated by the s-fold product of the l different species signal distributions $P_{sig}^l(n=0,\tau)$. Thus $P_{sig}$ (n,$\tau$) can be indicated in the present illustrative embodiment $$P_{sig}(n,\tau) = \begin{cases} e^{-(\sum_{l=1}^{s}\omega_l(\tau))} \\ \frac{1}{n}\sum_{v=1}^{n}vP_{sig}(n-v,\tau)\left(\sum_{l=1}^{s}\omega_l(\tau)P_{1,l}(v,\tau)\right) \end{cases}$$

for a system having s different species by:
wherein $P_{1,l}(v,\tau)$ indicates the probability for detecting v emissions of a single particle of species l during bin time $\tau$. As an example for a system having 2 different species (s=2) it can be shown:

$$P_{sig}(0,\tau)=e^{-(\omega_1(\tau)+\omega_2(\tau))}$$

$$P_{sig}(1,\tau)=e^{-(\omega_1(\tau)+\omega_2(\tau))}(\omega_1(\tau)P_{1,1}(1,\tau)+\omega_2(\tau)P_{1,2}(1,\tau)),$$

wherein $\omega_1(\tau)$ and $\omega_2(\tau)$, respectively, indicate the mean population number for the species 1 and 2, respectively, and $P_{1,1}$ and $P_{1,2}$, respectively, represent the probability distribution for the number of emissions during the bin time $\tau$ for a particle of species 1 or species 2, respectively.

In a further illustrative embodiment the noise signal distribution can be taken into account by means of the convolution of the noise signal distribution with the signal distribution $P_{sig}$ of the system having s different species as explained above. Assuming a Poisson noise, as is often the case and therefore is conventionally assumed when approximating noise performance, while the noise signal distribution is given by $$P_{noise}(n) = \frac{\lambda^n}{n!} e^{-\lambda},$$

it is possible n!according to the present illustrative embodiment for a system having s different species and considering the noise signal distribution to formulate a recursive expression for the signal distribution $P_{sig}(n,\tau)$ by:

$$P_{sig}(n, \tau) = \begin{cases} e^{-(\sum_{l=1}^{s}\omega_l(\tau)+\lambda)} & \text{for } n = 0 \\ \frac{\lambda}{n} P_{sig}(n-1, \tau) + \frac{1}{n}\sum_{v=1}^{n} v P_{sig}(n-v, \tau)\sum_{l=1}^{s}\omega_l(\tau)P_{1,l}(v, \tau) & \text{for } n > 0 \end{cases}$$

The moments $m_i^{sig}(\tau)$ can be determined in analogy to the calculation for a system having just one species j depicted above from this recursive formula for $P_{sig}(n,\tau)$ relating to the theoretical signal distribution for a system having s different species and taking into account the noise signal distribution $P_{noise}(n,\tau)$ assuming a Poisson noise distribution. By application of the conventional calculation methods mentioned above the moments $m_i^{sig}$ can be indicated as:

$$m_i^{sig} = \sum_{n=0}^{\infty} n^i P_{sig}(n, \tau)$$
$$= \sum_{v=1}^{i}\binom{i-1}{v-1} m_{i-v}^{sig}\left(\lambda + \sum_{l=1}^{s}\omega_l(\tau)m_{v,1}^{1}\right).$$

As in the example mentioned above relating to a system having only one particle species j the theoretical signal function can be shown also for the system having s different species of particles to be $$Q_{sig} = \frac{\sigma_{sig}^2 - \bar{n}_{sig}}{\bar{n}_{sig}}.$$

As explained above this yields upon insertion of the corresponding data:

$$Q_{sig} = \frac{\sum_{l=1}^{s} \bar{\mu}_{1,l} c_l \phi_{1,l}(\tau)}{\lambda + \sum_{l=1}^{s} \bar{\mu}_{1,l} c_l}$$

This theoretical signal function can thus be employed immediately in the numerical fit of a corresponding measurement value function in order to characterize a system having s species of particles. As explained this illustrative embodiment is based upon the assumption that the noise of the measuring apparatus can be expressed as Poisson noise having a rate of $\lambda$. In an illustrative embodiment of the invention the Poisson noise can be neglected by setting $\lambda=0$. Such an illustrative embodiment can yield very well approximated results of the constants to be determined, in particular if the signal noise ratio is high.

In a particularly advantageous embodiment the measurement value function is established with the expression $$\frac{\sigma(\tau)^2 - \bar{n}(\tau)}{\bar{n}(\tau)},$$

wherein the numerical fit is carried out by the relation $$Q(\tau) = \frac{\sigma(\tau)^2 - \bar{n}(\tau)}{\bar{n}(\tau)}$$
$$= \frac{m_2^{sig}(\tau) - [m_1^{sig}(\tau)]^2 - m_1^{sig}(\tau)}{m_1^{sig}(\tau)},$$

wherein $\sigma^2(\tau)$ represents the variance and $\bar{n}(\tau)$ represents the mean value of the number of detected emissions at bin time $\tau$. It has been found that this way the constants to be determined for characterizing the particles in the system and for characterizing the system, respectively, can be calculated particularly simply and precisely. Determination of the corresponding constants by measuring a system having particles emitting emittends and by evaluating the measurement results is explained as follows by means of several illustrative embodiments of the method according to the invention.

Figure 3:
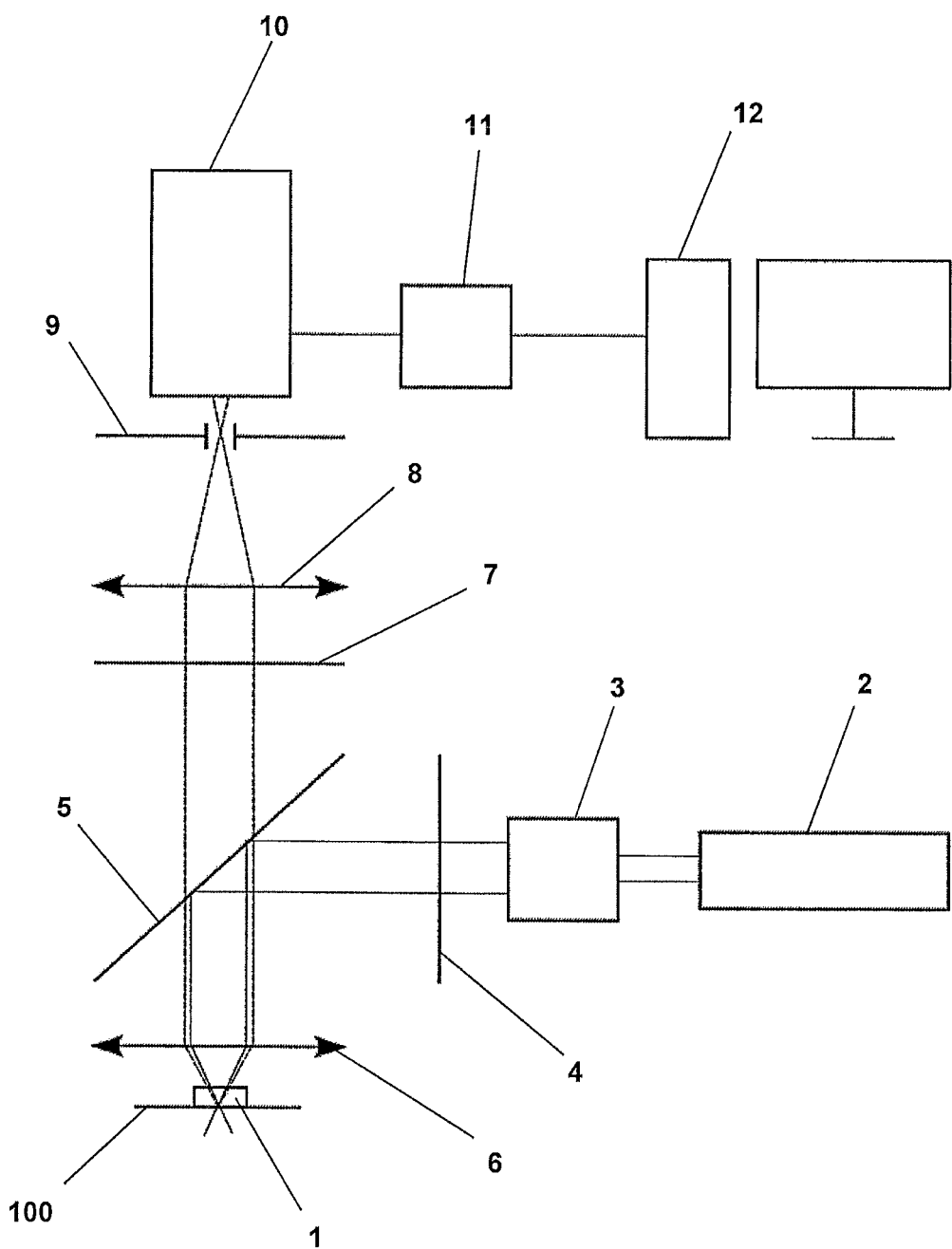
FIG. 3 is the schematic layout of a measuring apparatus as schematic diagram.

In the illustrative embodiments described the measurement for detecting the emissions of the particles in the system to be monitored is carried out by means of a measuring apparatus as depicted in FIG. 3. The illustrative embodiment as described deals with quantifying and characterizing particles in the system emitting photons as emittends. For performing the measurement a light source 2 is needed for stimulating the particles in the system. Particles emit photons after being stimulated, wherein the emission events are distributed statistically. The present measuring apparatus is for 1-photon stimulation.

A laser is being used as light source 2 in the measuring apparatus. The light emitted by light source 2 is focused by an illumination lens 3, filtered by a stimulation filter 4 and deflected to a lens 6 by the dichroic mirror 5. The lens 6 focuses the light emitted by light source 2 into the sample plane 100. Sample 1 comprising the system to be analyzed is located in the focus of lens 6 of the measuring apparatus so that the light emitted by light source 2 is focused in sample 1 comprising the system to its smallest volume in the measuring apparatus. In the illustrative embodiment shown the volume to which the light emitted by light source 2 is focused within a sample 1 is 0.5 fl.

Particles in sample 1 are stimulated to emit photons by light from light source 2. Photons emitted by particles in sample 1 are focused by lens 6 and reach tube lens 8 through dichroic mirror 5 and an emission filter 7 removing laser light from the beam. Tube lens 8 concentrates the beam formed by the emitted photons. The beam reaches detection unit 10 through an extremely small pinhole 9. The measuring apparatus described is configured for allowing detection of single photons emitted by particles in sample 1. The data sampling unit 11 connected to the detection unit 10 ensures time resolved detection. This means that data sampling unit 11 records at which point in time photons in the detection unit were detected in each case. Computer 12 allows evaluation of the detections of photons detected by data sampling unit scaled with time.

The detection unit 10 comprises a counter suited for detecting individual photons. In the illustrative embodiment described here avalanche photodiodes are employed for this purpose. When detecting a photon the detection unit 10 provides an output pulse to the data sampling unit 11 which is there provided with a timestamp and stored in a data storage medium in the computer 12. In the illustrative embodiment described the data sampling unit is a FPGA board allowing the time resolved storage of the photon detections.

In the illustrative embodiment described the measurement is carried out during the measuring period T. The detected emissions are stored in the computer 12 during the whole measuring period T in time resolved manner. Different interval widths τ are established thereafter for evaluation. The measuring period T is divided in $$A = \frac{T}{\tau}$$

wherein $A \in |N$ for each bin time τ. The number n of the photons detected during a time interval is determined for each of the A time intervals and for each bin time τ. The relative frequencies $$p_\tau(n, \tau) = \frac{a(n)}{A}$$

for each bin time τ are determined as a function of n from the number of intervals a(n) containing n photons. These relative frequencies can be construed as probabilities for detecting n photons within bin time τ if A is assumed to be sufficiently large. From these $p_\tau(n)$ the moments $m_i^{Mess}(\tau)$ can then be determined. In the illustrative embodiment this is done by:

$$m_i^{Mess}(\tau) = \sum_n n^i p_\tau(n).$$

In the illustrative embodiment described the function $$\mu(\tau) = \frac{Q(\tau)}{\tau}$$
$$= \frac{m_2^{Mess}(\tau) - [m_1^{Mess}(\tau)]^2 - m_1^{Mess}(\tau)}{m_1^{Mess}(\tau)} \frac{1}{\tau}$$

is used as measurement value function.

In the illustrative embodiment described the numerical fit is performed using the relation $$\mu(\tau) = \frac{Q(\tau)}{\tau}$$
$$= \frac{m_2^{sig}(\tau) - [m_1^{sig}(\tau)]^2 - m_1^{sig}(\tau)}{m_1^{sig}(\tau)} \frac{1}{\tau}.$$

Figure 4:
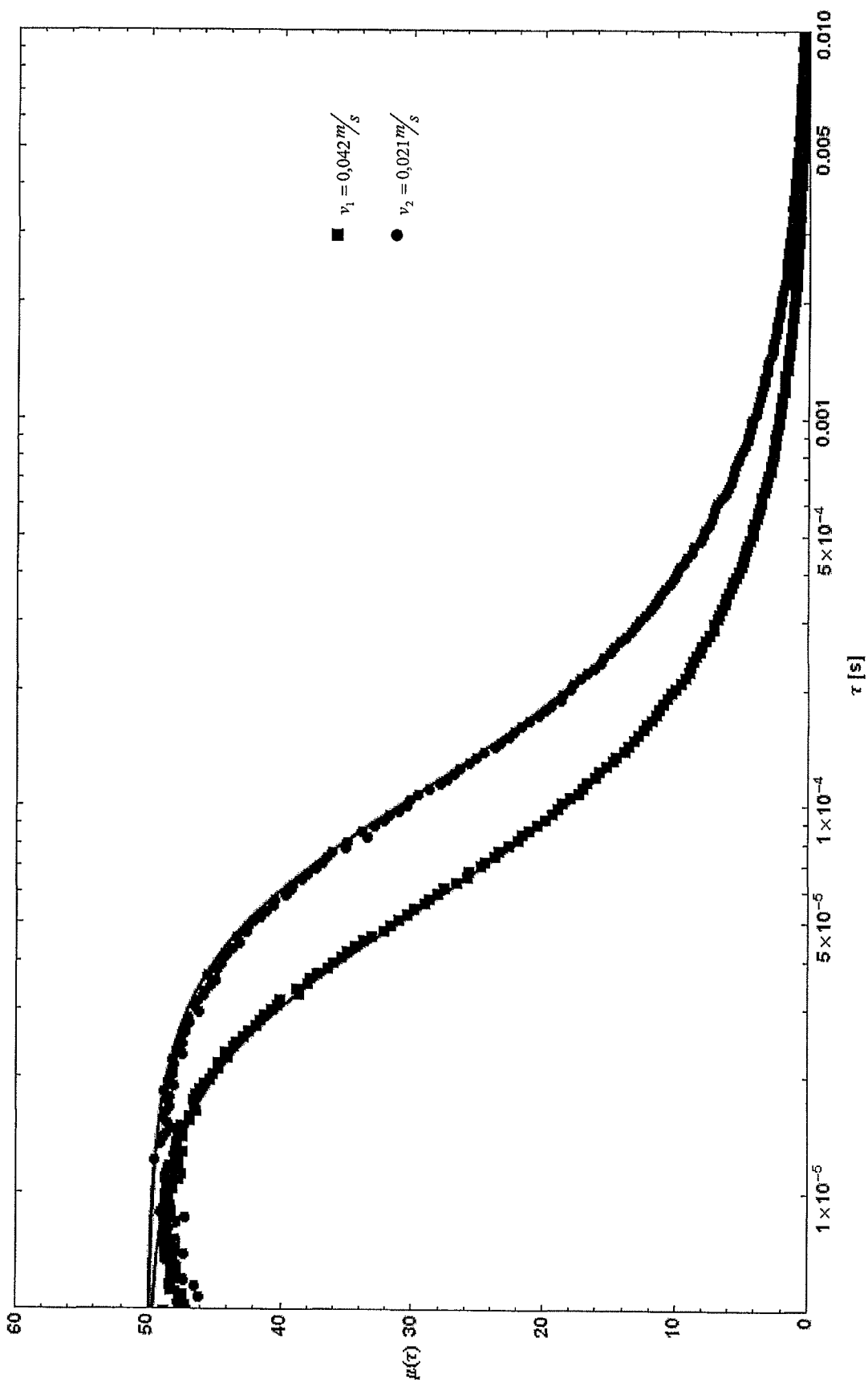
FIG. 4 is a graphic representation of the result of the numerical fit according to one embodiment of the invention.
Figure 5:
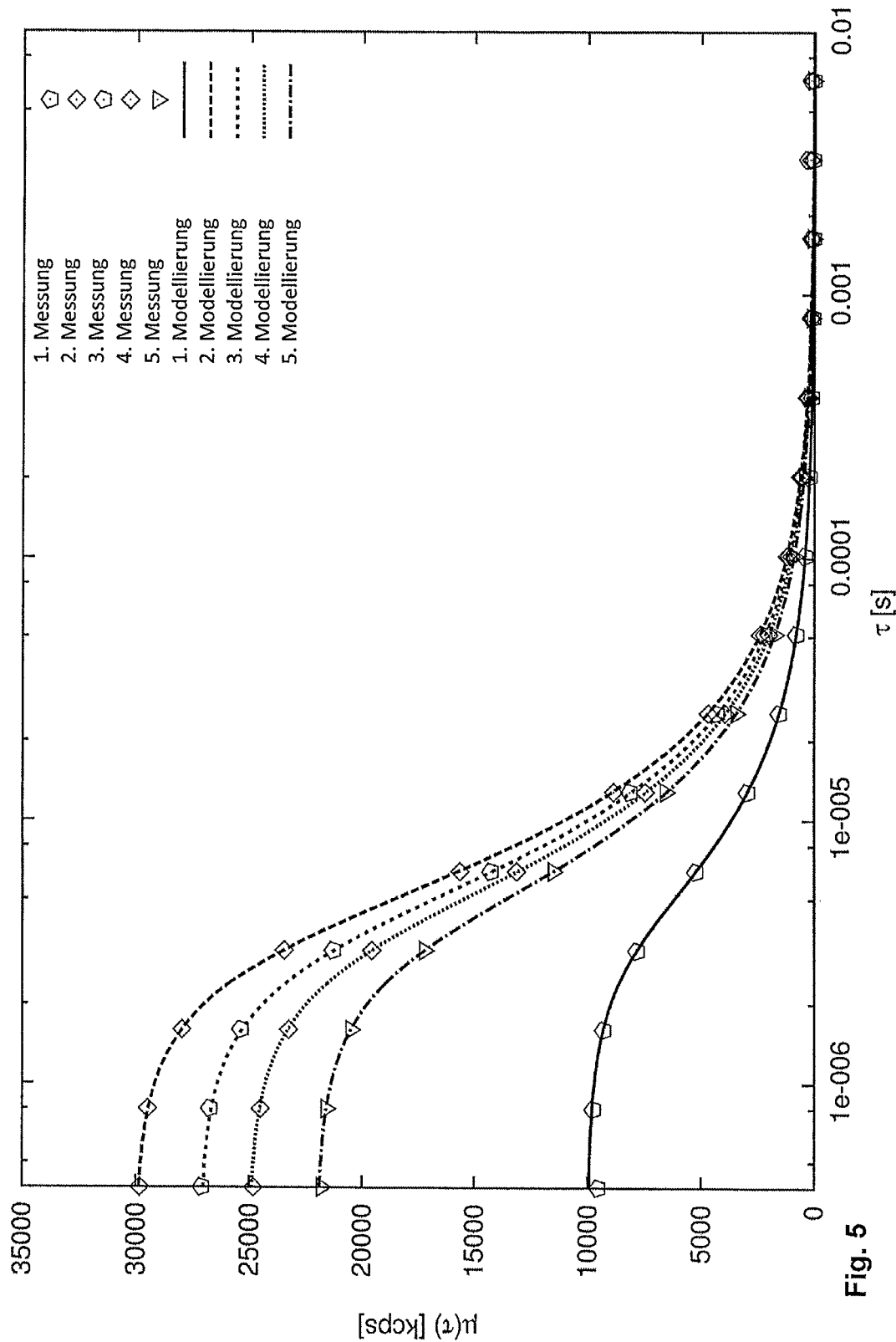
FIG. 5 is a graphic representation of the numerical fit according to another embodiment of the invention.

Thus the numerical fit is being effected by means of the theoretical signal function and a measurement value function which in each case, comprises correspondingly the same moments having the same functional relation with one another. The application of the method according to the invention to the analysis of the system, the particles of which are subject to a fluidic mass transport, is represented in FIGS. 4 and 5. FIG. 4 shows the results of measurement and evaluation for a system having only particles of one species. Measurement points of two different measurements are shown in FIG. 4. The chemical composition of the system was identical in each case for both measurements. The velocity of the fluidic mass transport the particles in the system are subject to is different for both measurements. In FIG. 4 the measurement values of µ(τ) determined by the measurement are drawn as measurement points. The square measurement points result from the first measurement during which a fluidic transport velocity $v_1$ predominated in the system. The measurement points with circular shape result from a second measurement during which a fluidic transport velocity $v_2$ predominated in the system. The functions µ(τ) were formed in each case by means of the measurement values of the first and the second measurements, respectively. In FIG. 4 the solid lines represent the theoretical signal functions after having determined the constants of the theoretical signal function by the numerical fit between the above-mentioned relation. From FIG. 4 it is evident that the course of the theoretical signal function is in very good agreement with the course of the measurement values for µ(τ).

The following consideration was the basis for the determination of the constants of the theoretical signal function by numerical fit in the illustrative embodiment outlined here:

The local dependency of the local detection rate $\mu_j(\vec{r})$ of the species j contained in the system is assumed to be a centrally symmetric Gaussian function according to $$\mu_j(\vec{r}) = \mu_{0,j} e^{-\frac{2}{a^2}\vec{r}^2}.$$

Thus $\bar{\mu}_{1,j}$ results to be:

$$\bar{\mu}_{1,j} = \int_R d^3 r \mu(\vec{r}) = \left(\frac{\pi}{2}\right)^{\frac{3}{2}} a^3 \mu_{0,j}.$$

In introducing the mean photon number $\phi_{1,j}(\tau)$ of a single particle as described above, $\phi_{1,j}(\tau)$ in the present case of deterministic fluidic transport results as:

$$\phi_{1,j}(\tau) = \frac{1}{\bar{\mu}_{1,j}}\left[\int_R d^3r_0\left(\int_0^\tau dt \int_R d^3r \mu_j(\vec{r})\delta(\vec{r}-\vec{r}')\right)^2\right] =$$

$$\frac{1}{\bar{\mu}_{1,j}}\left[\int_R d^3r_0\left(\int_0^\tau dt \mu_{0,j} e^{-\frac{2}{a^2}(x_0^2+y_0^2)}e^{-\frac{2}{a^2}(z_0+v_z t)^2}\right)\right] =$$

$$\frac{1}{\bar{\mu}_{1,j}}\left[\int_R d^3r_0\left(\frac{\sqrt{\pi}}{2\sqrt{2}}\frac{a\mu_{0,j}}{v}\exp\left[-\frac{2}{a^2}\binom{x_0^2+}{y_0^2}\right]\left(\begin{array}{c}\mathrm{erf}\left[\frac{\sqrt{2}}{a}\binom{z_0+}{v\tau}\right]-\\ \mathrm{erf}\left[\frac{\sqrt{2}}{a}z_0\right]\end{array}\right)\right)^2\right] =$$

$$\frac{1}{\bar{\mu}_{1,j}}\left[\int_{-\infty}^{+\infty}dz_0 \frac{\pi^2}{32}\frac{a^4\mu_{0,j}^2}{v^2}\left(\mathrm{erf}\left[\frac{\sqrt{2}}{a}\binom{z_0+}{v\tau}\right]-\mathrm{erf}\left[\frac{\sqrt{2}}{a}z_0\right]\right)^2\right] =$$

$$\frac{\sqrt{\pi}}{2\sqrt{2}}\frac{\mu_{0,j}}{2a}\frac{\vartheta_j^2}{\tau}\int_{-\infty}^{+\infty}dz_0\left(\mathrm{erf}\left[\frac{1}{\vartheta_j}\left(\frac{z_0}{v}+\tau\right)\right]-\mathrm{erf}\left[\frac{z_0}{v\vartheta_j}\right]\right)^2.$$

It had been assumed that the observed particle of species j is in location $\vec{r}=\vec{r}_0$ at time $t=t_0$ so that the probability density for the particle could be indicated by the Dirac delta function $\delta(\vec{r}-\vec{r}_0)$. In addition the decay time $\theta_j$ was introduced with $$\vartheta_j = \frac{a}{\sqrt{2}}v.$$

Furthermore it was assumed that the fluidic stream occurs in z direction so that transport of the particles is assumed to be in z direction only. While the integral over the unlimited space could be carried out over $x_0$ and $y_0$ the integral over $z_0$ cannot be executed analytically. In the illustrative embodiment shown this is performed immediately by numerical fit. Based upon the assumptions and transformations mentioned above the numerical fit is carried out in the illustrative embodiment according to the invention as outlined by means of the relation $$\mu(\tau) = \frac{\phi_{1,j}(\tau)}{\tau} = \frac{\sqrt{\pi}}{2\sqrt{2}}\frac{\mu_{0,j}}{2a}\left(\frac{\vartheta_j}{\tau}\right)^2 \int_{-\infty}^{+\infty}dz_0\left(\mathrm{erf}\left[\frac{1}{\vartheta_j}\left(\frac{z_0}{v}+\tau\right)\right]-\mathrm{erf}\left[\frac{z_0}{v\vartheta_j}\right]\right)^2.$$

From the theoretical signal unction used in the present illustrative embodiment it can be understood that the concentration $c_j$ of the species j in the system is not a constant comprised in the theoretical signal function when applying the method according to the invention to a system with only one emitting species j. The only constants to be determined in the numerical fit are $\mu_0$, $v$ and $a$, wherein $\theta_j$ can be expressed as dependent on a and v as explained above.

The numerical fit can be simplified by a limit value consideration. This limit value consideration $$\lim_{\tau \to 0}$$

yields:

$$\lim_{\tau\to 0}\mu(\tau) = \lim_{\tau\to 0}\frac{\sqrt{\pi}}{2\sqrt{2}}\frac{\mu_{0,j}}{2a}\left(\frac{\vartheta_j}{\tau}\right)^2\int_{-\infty}^{+\infty}dz_0\left(\mathrm{erf}\left[\frac{1}{\vartheta_j}\left(\frac{z_0}{v}+\tau\right)\right]-\mathrm{erf}\left[\frac{z_0}{v\vartheta_j}\right]\right)^2 =$$

$$\frac{\sqrt{\pi}}{2\sqrt{2}}\frac{\mu_{0,j}}{2a}v\vartheta_j\int_{-\infty}^{+\infty}dz\lim_{h\to 0}\left(\frac{\mathrm{erf}[z+h]-\mathrm{erf}[z]}{h}\right)^2 = \frac{\mu_{0,j}}{2\sqrt{2}}.$$

$\mu_{0,j}$, a, v, and $v_2$ can be determined from FIG. 4 by means of the relation mentioned above between measuring value function $\mu(\tau)$ and theoretical signal function mentioned above through the limit consideration described above and they have the following values:

$\mu_{0,j}$=50 kcps (kilo counts per second)
$a=1*10^{-6}$ m
$v_1$=0,042 m/s
$v_2$=0,021 m/s.

The measuring value functions for both measurements are approaching the same limit value $$\lim_{\tau\to 0}\mu(\tau)$$

as evident from FIG. 4. This results as mentioned above from the fact that the limit value is not dependent on the velocity of the fluidic mass transport of the particles in the system during the measurement. Performing the method according to the invention with systems being prepared with known parameters, in particular a known velocity and a known detection rate of the particles, has shown that the method according to the invention yields data for characterizing the particles (relating to $\mu_{0,j}$) and the relating to the time-dependent behavior of the particles in the system ($v,\theta_j$).

In particular it is apparent from FIG. 4 that the theoretical signal function is in very good agreement with the measuring value function.

As shown in FIG. 5, the method according to the invention can be applied to a system having particles of different species in a similar way as in the preceding illustrative embodiment for fluidic mass transport in the system having just one emitting particle species j. Similar to FIG. 4 measurement values from five different measurements as well as the model theoretical signal function as determined by numerical fit are represented graphically in FIG. 5 for the corresponding five different measurements. As in FIG. 4 the detection rate $\mu(\tau)$ is shown as measurement value function at single measurement points of the corresponding measurements in FIG. 5, too. The particles were subject in each case to the same velocity of the fluidic transport. In all measurements the system analyzed contains particles of one or two out of two species predetermined for all measurements. The system differs in its composition or in the concentrations of particle species, respectively, between the respective measurements. Each of the particle species has a different characteristic detection brightness $\mu_{0,j}$. The theoretical signal distribution for the numerical fit according to FIG. 5 was formed by the function $$\frac{m_2^{sig}(\tau)-[m_1^{sig}(\tau)]^2-m_1^{sig}(\tau)}{m_1^{sig}(\tau)}$$

in an analogy to the illustrative embodiment shown in FIG. 4, wherein, as outlined above, this function is defined as $$\frac{\sum_{j=1}^{2} \overline{\mu}_{1,j} c_j \phi_{1,j}(\tau)}{\sum_{j=1}^{2} \overline{\mu}_{1,j} c_j}$$

with the particle species 1 and 2 by means of neglecting the noise. Calculation or execution, respectively, of these equation is carried out as in the illustrative example according to FIG. 4 described above. The numerical fit starts from $$\mu(\tau) = \frac{1}{\tau} \frac{\sum_{j=1}^{2} \overline{\mu}_{1,j} c_j \phi_{1,j}}{\sum_{j=1}^{2} \overline{\mu}_{1,j} c_j}$$

with $$\phi_{1,j} = \frac{1}{\overline{\mu}_{1,j}} \left[ \int_{-\infty}^{+\infty} dz_0 \frac{\pi^2}{32} \frac{a^4 \mu_{0,j}^2}{v^2} \left( \text{erf}\left[\frac{\sqrt{2}}{a}\left(\frac{z_0 +}{v\tau}\right)\right] - \text{erf}\left[\frac{\sqrt{2}}{a} z_0\right] \right)^2 \right].$$

The constants $\mu_{0,1}$, $\mu_{0,2}$, v and a (and here from $$\vartheta_1 = \vartheta_2 = \frac{a}{\sqrt{2}} v)$$

can be determined from the numerical fit as follows: $\mu_{0,1}=1*10^4$ kcps, $\mu_{0,2}=3*10^4$ kcps, $a=1*10^{-6}$ m and $v=0.42$ m/s was determined for all measurements. Further it was determined:

First measurement: $c_1=5*10^{-10}M; c_2=0.$

Second measurement: $c_2=5*10^{-10}M; c_1=0.$

Third measurement: $c_1=5*10^{-10} M; c_2=1,0*10^{-9}M.$

Fourth measurement: $c_1=5*10^{10}M; c_2=5*10^{-10}M.$

Fifth measurement: $c_1=5*10^{10}M; c_2=2.5*10^{-10}M.$

Applications of the method according to the invention for applying to systems having particles subject to a diffusion transport in the system are described in FIGS. 6 to 9 by means of further illustrative embodiments. The same mathematical transformations and definitions are the exemplary start point for the illustrative embodiments shown in each case. A corresponding numerical fit between measurement value function and signal function can be evidently carried out as well by different mathematical approaches.

In the examples according to the FIGS. 6 to 9 the local probability distribution $\psi(\vec{r},t|\vec{r}_0,t_0)$ has also to be determined as in the examples relating to FIG. 4 and FIG. 5. This probability distribution was approximated by means of Dirac's delta function in the case of a fluidic transport in FIGS. 4 and 5. This approximation is not applicable in case of diffusion transport. Instead the probability distribution $\psi(\vec{r},t|\vec{r}_0,t_0)$ is defined by $$\frac{\partial}{\partial t}\psi(\vec{r}, t|\vec{r}_0, t_0) = D\Delta\psi(\vec{r}, t|\vec{r}_0 t_0)$$

in the illustrative embodiment described. This equation is known as Einstein's equation of diffusion. A known solution to this equation under the starting and boundary conditions $\psi(\vec{r},t \to t_0|\vec{r}_0,t_0)=\delta(\vec{r}-\vec{r}_0)$, $\psi(|\vec{r}| \to \infty, t|\vec{r}_0,t_0)=0$ is known as the Green function $$\psi(\vec{r}, t|\vec{r}_0, t_0) = (4\pi D(t-t_0))^{-\frac{3}{2}} \exp\left[-\frac{(\vec{r}-\vec{r}_0)^2}{4D(t-t_0)}\right].$$

Thus this expression is assumed as local probability distribution $\psi(\vec{r},t|\vec{r}_0,t_0)$ for the species j.

A spherical measurement symmetry, that is spherical symmetry of the spatial dependency of the detection rate in the measurement volume, can be assumed in an illustrative embodiment not shown graphically here. In the illustrative embodiment a system having only one emitting species, which emits photons, is being analyzed. The local dependency of the detection rate $\mu(\vec{r})$ is being assumed as $$\mu(\vec{r}) = \mu_{0,j} e^{-\frac{2}{a^2}\vec{r}^2}$$

similar to the illustrative embodiment described in FIGS. 4 and 5. The function $\phi_{1,j}(\tau)$ can thus be indicated similarly by means of the local probability distribution $\psi_j(\vec{r},t|\vec{r}_0,t_0)$ to be:

$$\phi_{1,j}(\tau) = \frac{1}{\int_R d^3r \mu_j(\vec{r})} \left[\int_0^\tau dt \int_R d^3r_0 \left(\int_R d^3r \mu_j(\vec{r})\psi_j(\vec{r}, t|\vec{r}_0, t_0)\right)^2\right] =$$

$$\frac{1}{\left(\frac{\pi}{2}\right)^{\frac{3}{2}} a^3 \mu_{0,j}} \left[\int_0^\tau dt \int_R d^3r_0 \left(\mu_{0,j}\beta(t)^3 e \exp\left[-2\frac{\beta(t)^2}{a}\vec{r}_0^2\right]\right)^2\right] =$$

$$\frac{\mu_0}{\sqrt{2}} \vartheta_j \left(1 - \frac{1}{\sqrt{1+\frac{\tau}{\vartheta_j}}}\right),$$

which allows the numerical fit by means of $$\mu(\tau) = \frac{\phi_{1,j}(\tau)}{\tau}.$$

Herein $\beta(t)$ was introduced to allow mathematical transformation and was defined as $$\beta(t) = \frac{1}{\sqrt{\frac{t}{\vartheta_j}+1}} \quad und \quad \vartheta_j = \frac{a^2}{8D}.$$

A corresponding limiting value consideration again allows forming:

$$\lim_{\tau \to 0} \mu(\tau) = \frac{\mu_{0,j}}{2\sqrt{2}} \text{ and}$$

$$\lim_{\tau \to 0} \phi_{1,j}(\tau) = 0 \text{ and}$$

$$\lim_{\tau \to \infty} \mu(\tau) = 0 \text{ and}$$

$$\lim_{\tau \to \infty} \phi_{1,j}(\tau) = \frac{\mu_{0,j}}{\sqrt{2}} \vartheta_j.$$

when applying the method in the embodiments according to FIGS. 6 to 9 a spheroidal [rotation ellipsoidal] symmetry of the spatial dependency of the detection rate in the measurement volume is assumed. Correspondingly the local detection rate $\mu_j(\vec{r})$ has to be based upon another local dependency. In the illustrative embodiment described the system is being stimulated by 1-photon-stimulation and the local dependency can be taken into account by a Gaussian function according to $$\mu_j(\vec{r}) = \mu_{0,j} \exp\left(-\frac{2}{a_{xy}^2}(x^2 + y^2)\right) \exp\left(-\frac{2}{a_z^2} z^2\right).$$

In order to determine $\phi_{1,j}(\tau)$ this assumption allows determining:

$$\int_R d^3 r \mu_j(\vec{r}) \psi_j(\vec{r}, t | \vec{r}_0, t_0 = 0) =$$

$$\frac{\mu_{0,j}}{\left(1 + \frac{t}{\vartheta_{xy}}\right)\sqrt{1 + \frac{t}{\vartheta_z}}} \exp\left(-\frac{2}{a_{xy}^2} \frac{x_0^2 + y_0^2}{\left(1 + \frac{t}{\vartheta_{xy}}\right)}\right) \exp\left(-\frac{2}{a_z^2} \frac{z_0^2}{\left(1 + \frac{t}{\vartheta_z}\right)}\right)$$

with the characteristic decay times $$\vartheta_{xy} = \frac{a_{xy}^2}{8D} \text{ and } \vartheta_z = \frac{a_z^2}{8D}.$$

Furthermore $\bar{\mu}_{1,j}$ can be indicated to be:

$$\bar{\mu}_{1,j} = \int_R d^3 r \mu_j(\vec{r}) = \left(\frac{\pi}{2}\right)^{\frac{3}{2}} \mu_{0,j} a_{xy}^2 a_z.$$

Inserting results in:

$$\phi_{1,j}(\tau) =$$

$$\int_0^\tau \frac{\mu_{0,j}}{2^{\frac{3}{2}}} \frac{1}{\left(1 + \frac{t}{\vartheta_{xy}}\right)\sqrt{1 + \frac{t}{\vartheta_z}}} = \frac{\mu_0}{2^{\frac{3}{2}}} \int_0^\tau dt \frac{\vartheta_{xy}}{(\vartheta_{xy} - \vartheta_z + \vartheta_z + t)} \frac{\sqrt{\vartheta_z}}{\sqrt{\vartheta_z + t}}.$$

Distinguishing different cases is required in the further steps for determining $\phi_{1,j}(\tau)$.

In case of $\vartheta_{xy} > \vartheta_z$ purely mathematical transforming results in:

$$\phi_{1,j}(\tau) = \frac{\mu_{0,j}}{2^{\frac{3}{2}}} \frac{\sqrt{\vartheta_z}}{\sqrt{\vartheta_{xy} - \vartheta_z}}$$

$$2\vartheta_{xy}\left(\arctan\left[\sqrt{\frac{\vartheta_z}{\vartheta_{xy} - \vartheta_z}}\sqrt{1 + \frac{\tau}{\vartheta_z}}\right] - \arctan\left[\sqrt{\frac{\vartheta_z}{\vartheta_{xy} - \vartheta_z}}\right]\right).$$

In case of $\vartheta_z > \vartheta_{xy}$ purely mathematical transforming results in:

$$\phi_{1,j}(\tau) = \frac{\mu_{0,j}}{2^{\frac{3}{2}}} \frac{\gamma^2 - 1}{\gamma} \vartheta_z \left(\ln\left(\frac{\gamma+1}{\gamma-1}\right) - \ln\left(\frac{\gamma\sqrt{1 + \frac{\tau}{\vartheta_z}} + 1}{\gamma\sqrt{1 + \frac{\tau}{\vartheta_z}} - 1}\right)\right),$$

wherein $\gamma = \sqrt{\frac{\vartheta_z}{\vartheta_z - \vartheta_{xy}}}$, wherein $\gamma$ describes a parameter of the apparatus.

In the illustrative embodiment relating to applying the method according to the invention to a system having the species j mentioned above wherein the particles of species j are subject to a diffusion transport, in each case the numerical fit is carried out by means of the relation $$\mu(\tau) = \frac{\phi_{1,j}(\tau)}{\tau},$$

wherein $\mu(\tau)$ is the measurement value function and $$\frac{\phi_{1,j}(\tau)}{\tau}$$

is the theoretical signal function.

In the illustrative embodiments described above the noise performance of the measuring apparatus is neglected in each case in order to facilitate the numerical fit. When performing the method according to the invention a procedure as outlined in the illustrative embodiments according to the FIGS. 6 to 9 may be appropriate.

Figure 6B:
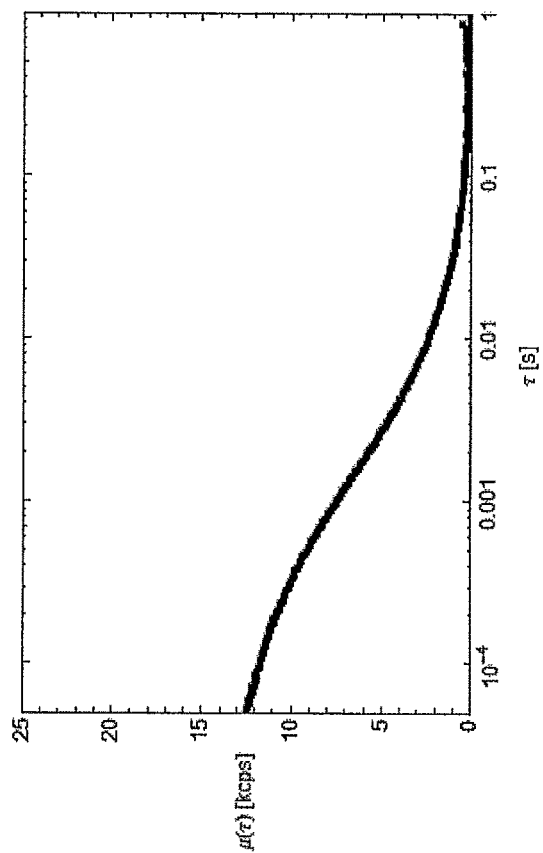
FIGS. 6a-6d are graphic representations of the results of the numerical fit of still another embodiment of the invention.
Figure 6D:
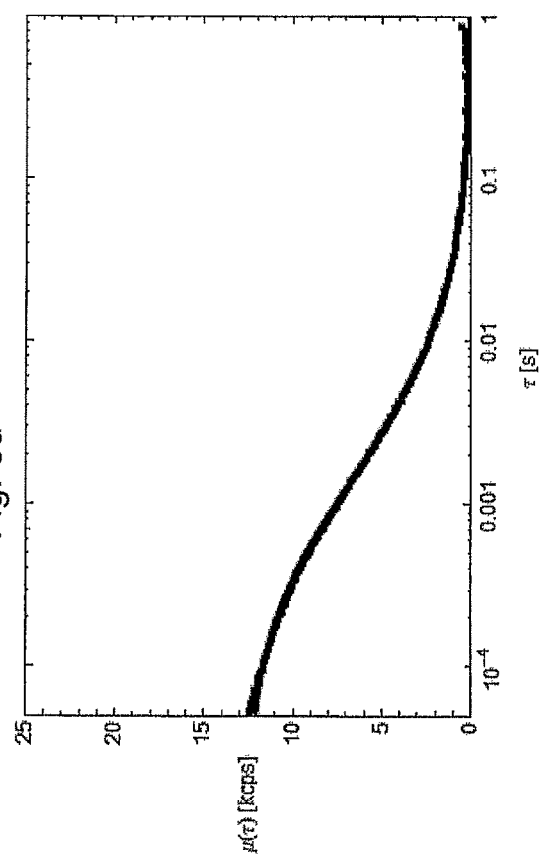
Figure 6A:
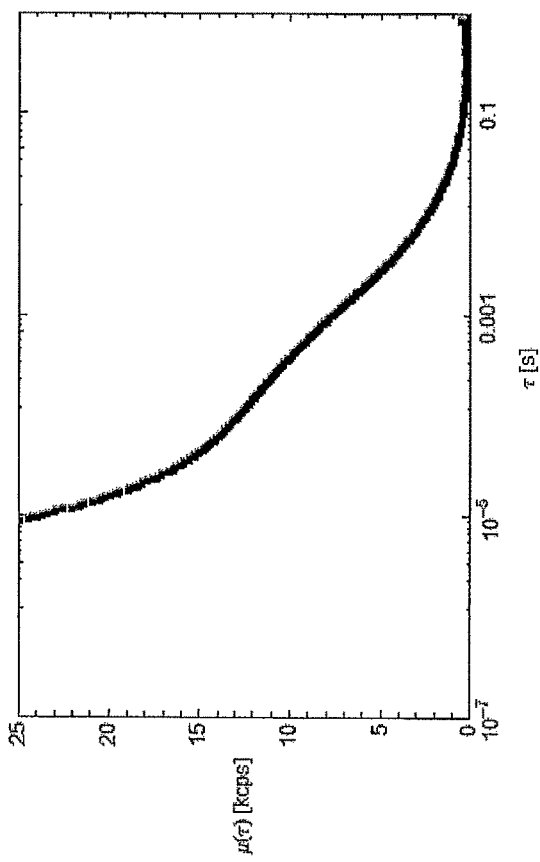

In FIG. 6a the measurement value function $\mu(\tau)$ resulting from the measurement data as described above is represented for individual measurement points. It is evident from FIG. 6a that the measurement value function $\mu(\tau)$ increases rapidly at small $\tau$. This unusual course of $\mu(\tau)$ is based upon the performance of the detection unit 10 as for example noise or dead time of the detector. The measuring value function of the detector noise alone has to be determined and then has to be subtracted from the measurement value function $\mu(\tau)$ of the measurement data according to FIG. 6a in order to correct for this effect. FIG. 6b shows the measurement value function $\mu(\tau)$ adjusted for detector noise. In the method described in accordance with FIGS. 6 to 10 detector noise is determined as an intermediate step and subtracted from the measured measurement value function $\mu(\tau)$ before carrying out the numerical fit so as to generate an adjusted measurement value function $\mu(\tau)$. This adjusted measurement value function $\mu(\tau)$ is then utilized for the numerical fit with the theoretical signal function and is then employed as described above in applying the method to a system with particles subject to diffusion transport. Generally in an embodiment according to the invention the measurement value function is adjusted by subtracting the noise of the measuring apparatus. Thus noise of the measuring apparatus can be neglected in defining the theoretical signal function while precise results can at the same time be obtained by numerical fit and simple numerical fit is possible due to the simple formulation of the theoretical signal function.

Figure 6C:
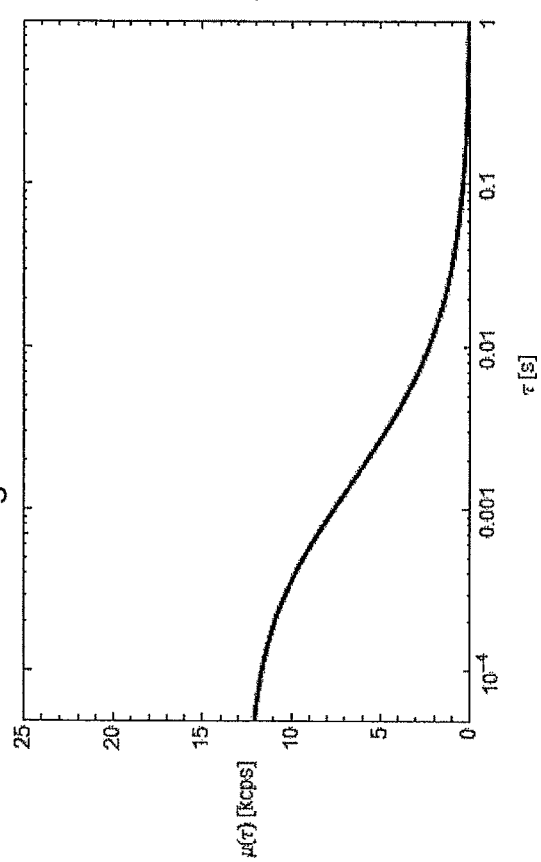

The theoretical signal function after determination of the constants thereof is depicted in FIG. 6c. The constants have been determined by numerical fit assuming a rotation ellipsoidal symmetry in the illustrative embodiment according to FIG. 6 and FIG. 7 and the numerical fit is carried out by means of the relation:

$$\mu(t) = \frac{\mu_{0,j}}{2^{\frac{3}{2}}} \frac{\gamma^2-1}{\gamma} \frac{\vartheta_z}{\tau} \left( \ln\left(\frac{\gamma+1}{\gamma-1}\right) - \ln\left( \frac{\gamma\sqrt{1+\frac{\tau}{\vartheta_z}}+1}{\gamma\sqrt{1+\frac{\tau}{\vartheta_z}}-1} \right) \right).$$

In FIG. 6d the superposition of the measurement value function $\mu(\tau)$ with the theoretical signal function (as shown alone in FIG. 6c and resulting from the numerical fit). From FIG. 6d it is evident that the method according to invention allows for an extraordinary agreement of the theoretical signal function with the measurement value function $\mu(\tau)$. This is based upon the assumptions according to the invention allowing formulation of the theoretical signal function and the measurement value function in such a way that a simple and thus also precise numerical fit requiring low characterization effort is possible. The assumptions and transformations explained above contribute in particular to this result when being applied to the illustrative embodiment described in FIGS. 6 and 7.

FIG. 7 depicts an illustrative embodiment of the method according to the invention in which a measurement and a numerical fit were carried out for characterizing a system accommodating emitting particles of only one species j similar to the illustrative embodiment according to FIG. 6. The results of a total of 12 measurements are represented in FIG. 7. In the first three measurements a first concentration $c_1$ of the species in the system, in the fourth to sixth measurement a concentration $c_2$, in the seventh to ninth measurement a concentration $c_3$ and in the tenth to twelfth measurement a concentration $c_4$ was set in preparing the system.

Figure 7A:
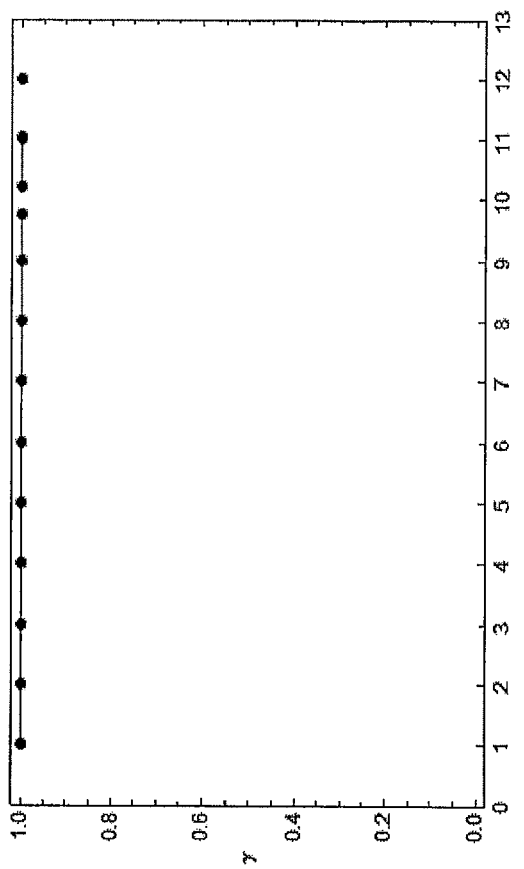
FIGS. 7a-7d are graphic representations of the characteristic data obtained from the numerical fit in the embodiment according to FIG. 6.

Values for the characteristic detection brightness of the particles of species j in the system are indicated in FIG. 7a for all 12 measurements. As expected the value of the characteristic detection brightness $\mu_{0,j}$ of species j does not change dependent on the set concentration of the species in the system. The decrease of the value for $\mu_0$ during each measurement series comprising three tests for each concentration $c_1$, $c_2$, $c_3$ and $c_4$ is due to the so-called "bleaching" of the particles during the measurement series causing a decrease of the characteristic brightness of the particles. Correspondingly the characteristic detection brightness $\mu_0$ increases in the course of the measurement series. From FIG. 7a it is evident that the method according to the invention provides reproducible results in regard of the characteristic detection brightness of the particles.

Figure 7B:
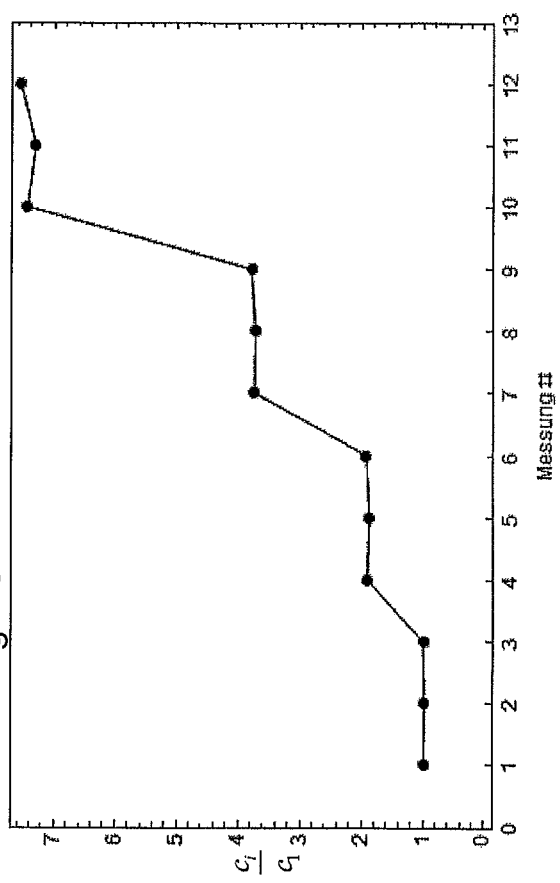

FIG. 7b indicates the apparatus parameter $\gamma$ which is calculated by means of $$\gamma = \sqrt{\frac{\vartheta_z}{\vartheta_z - \vartheta_{xy}}}$$

from the numerical fit. It can be expected that in the illustrative embodiment shown the apparatus parameter $\gamma$ is a constant for all concentrations of the species in the system, since in the present case $\theta_z$ and $\theta_{xy}$ are predetermined in such a way that $\theta_z$ and $\theta_{xy}$ characterize the travelling time across the measurement volume. In the illustrative embodiment shown the particles of species j are not subject to any decay in the system but contribute as long to the detected rate as they are located within the measurement volume. The fact that the apparatus parameter $\gamma$ is found to be constant by the numerical fit in the method according to the invention confirms the precision of the method according to the invention when analyzing systems having emitting particles.

Figure 7C:
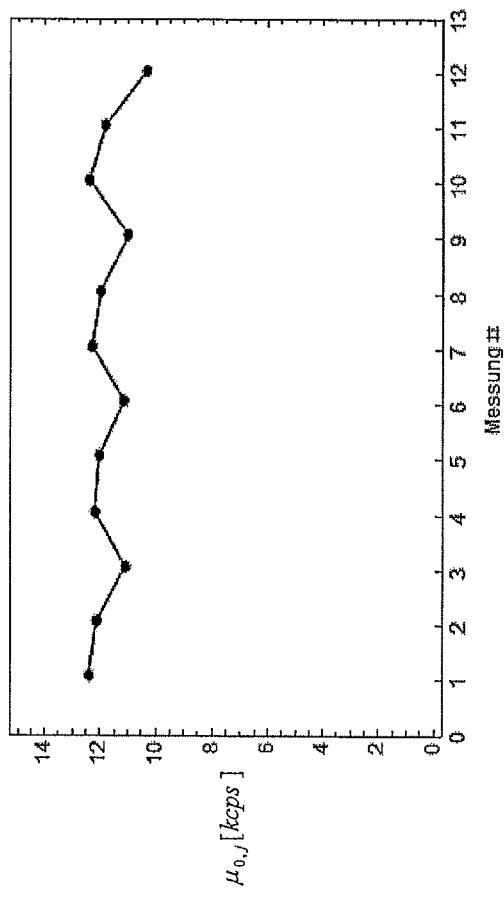
Figure 7D:
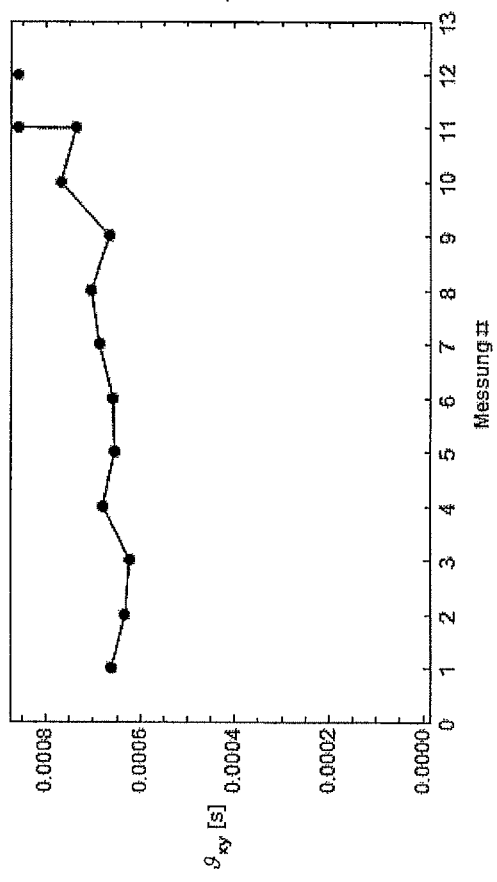
Figure 9A:
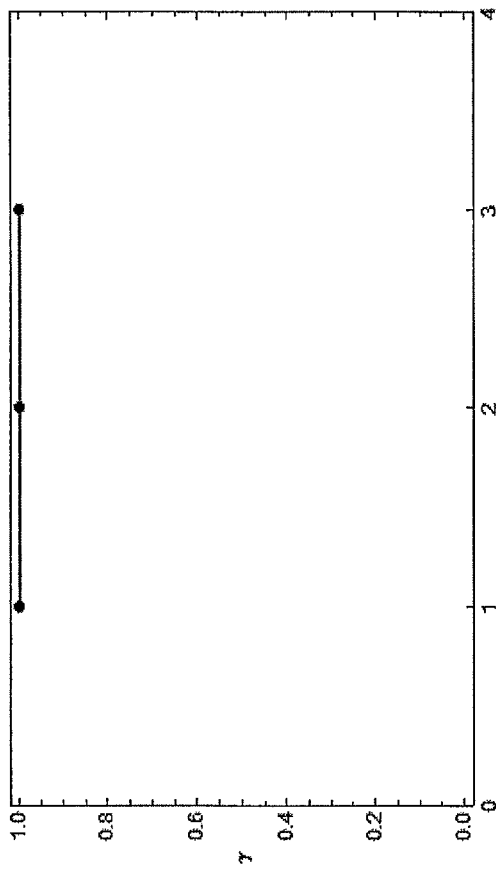
FIGS. 9a-9d are graphic representations of the characteristic data obtained from the fit according to FIG. 8.
Figure 9B:
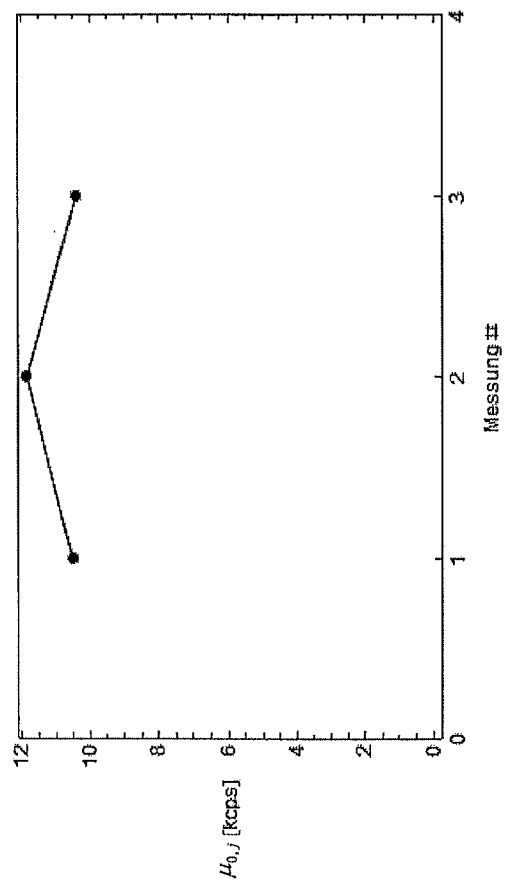
Figure 9C:
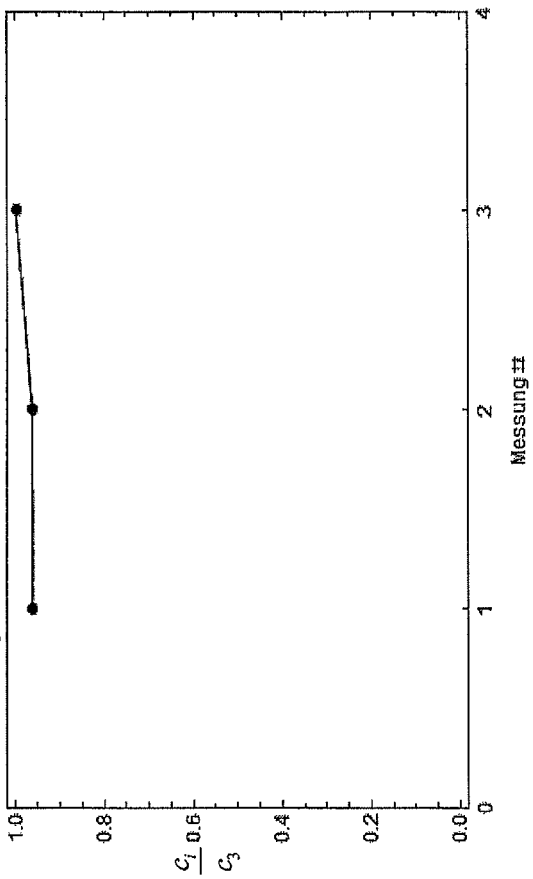
Figure 9D:
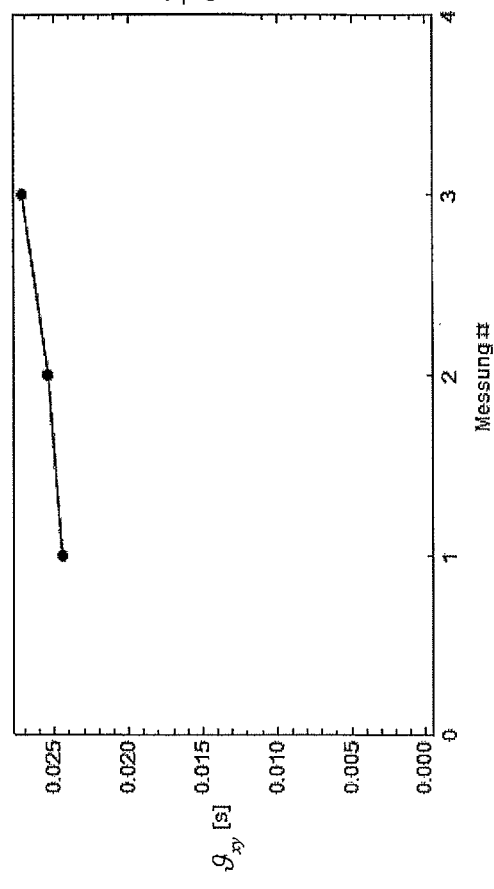

The transversal decay time $\theta_{xy}$ for the 12 measurements is indicated in FIG. 7c. It is evident from FIG. 7c that irrespective of measuring errors a constant decay time $\theta_{xy}$ is determined for the particles of species j in the system. The decay time $\theta_{xy}$ is to be construed as being the travelling time of the particles across the measurement volume in the xy-plane FIG. 7d indicates the relative concentrations $c_1:c_2:c_3:c_3$. As a starting point for the relative concentrations relative to $c_1$, the concentration of the particles in the first three measurements ($c_1$) is arbitrarily set to 1. The relative concentrations of FIG. 7d were determined by means of the relation of the mean detected number of photons $\bar{n}_j$ of the measurements in accordance with the illustrative embodiment of the method according to the invention. The relation $\bar{n}_j = c_j \bar{\mu}_{1,j} \tau$ was utilized. $\bar{\mu}_{1,j}$ can be determined by means of the theoretical signal function, $\bar{n}_j$ corresponds to the number of detected photons, so that $c_j$ can be determined for each measurement. At this point an important general and basic advantage of the method according to the invention becomes clear: Since the set of measurement data utilized according to the invention comprises the time resolved recorded number n of detected emissions, these quantitative measurement values can be used in the evaluation so that the evaluation can be carried out comprehensively. Another option of determining the relation of concentrations between the individual measurements is to determine the occupancy number $\omega_j(\tau)$ immediately from the probability of 0-events because $P_{sig}(n,\tau) = e^{-\omega_j(\tau)}$ for n=0 applies. Correspondingly the relations of the concentrations can be determined by means of the relations of the mean occupancy numbers $\omega_j(\tau)$.

In FIGS. 8 and 9 the results of another illustrative embodiment of the method according to the invention in an application to a system having one particle species j is shown. FIG. 8a depicts—similar to FIG. 6a—the measured measurement value function $\mu(\tau)$. In FIG. 8b $\mu(\tau)$ is adjusted for detector noise. FIG. 8c shows the theoretical signal function determined by the numerical fit with the adjusted measurement value function $\mu(\tau)$ from FIG. 8b. In FIG. 8d the superposition of the graphs from FIGS. 8b and 8c is shown. It is evident from FIG. 8d that an extraordinary fit of the theoretical signal function to the measurement value function for transmitting the constants characterizing the system and the particles, respectively, is possible.

As in the illustrative embodiment according to the FIGS. 6 and 7 the equation $$\mu(t) = \frac{\mu_{0,j}}{2^{\frac{3}{2}}} \frac{\gamma^2 - 1}{\gamma} \frac{\vartheta_z}{\tau} \left( \ln\left(\frac{\gamma+1}{\gamma-1}\right) - \ln\left(\frac{\gamma\sqrt{1+\frac{\tau}{\vartheta_z}}+1}{\gamma\sqrt{1+\frac{\tau}{\vartheta_z}}-1}\right) \right)$$

was utilized for the numerical fit.

In FIG. 9 the constants to be determined in the theoretical signal function are indicated. Three measurements were performed in the illustrative embodiment according to FIG. 9. Each sample was measured in three different places. FIG. 9 represents the results of the three measurements for the characteristic detection brightness $\mu_{0,j}$ of species j, FIG. 9b the results for the apparatus parameter $\gamma$, FIG. 9c the results for the transversal decay time $\theta_{xy}$ and FIG. 9d the relative concentrations having been determined relative to one another in the respective measurements. The concentrations were determined as explained above relative to FIG. 7, wherein $c_3$, that is the concentration in the third measurement, was set to 1. The determination of the values is carried out as explained with the example of FIGS. 6 and 7 similar to the illustrative embodiment according to FIG. 8 and FIG. 9.

Utilizing the ratio $$\vartheta_{xy} = \frac{a_{xy}^2}{8D} \text{ or } \vartheta_z = \frac{a_z^2}{8D},$$

respectively, and the procedure according to FIGS. 6 and 7 or the procedure according to FIGS. 8 and 9, in each case determining experimentally the decay time $\theta_{xy}$, one of the two values $a_{xy}$ or D can be determined if the other of both is known. Correspondingly this is possible also with $a_z$ or D if $\theta_z$ has been determined.

The standard fluorophore Alexa 488 was utilized as emitting particle species j when preparing the system in the illustrative embodiment according to FIGS. 6 and 7. The diffusion constant D was determined very precisely for this dye (according to Schwille) and amounts to $D=4.35*10^{-10}$ m²/s for Alexa 488 in aqueous solution as is the case in the system applied in the illustrative embodiment according to FIGS. 6 and 7. The parameter $a_{xy}$, which is independent on the properties of the particles and predetermined by the measuring apparatus can be determined to be $a_{xy}=1,55*10^{-6}$ m by utilizing the decay time $\theta_{xy}$ which was determined in accordance with FIG. 7c as $\theta_{xy}=6,9*10^{-4}$ s.

In the illustrative embodiment according to FIGS. 8 and 9 the same measuring apparatus was used so that the same $a_{xy}$ can be assumed. The system analyzed in the illustrative embodiment according to FIGS. 8 and 9 contains monodisperse nanoparticles as emitting particles. Knowing $a_{xy}=1,55*10^{-6}$ m and the decay time $\theta_{xy}=2,9*10^{-2}$ s determined from FIG. 9c it is possible to determine the diffusion constants as $D=1,04*10^{-11}$ m²/s. Alternatively the diffusion constant can be determined according to Einstein by means of $$D = \frac{k_B T}{6\pi\eta R_0}.$$

Inserting $R_0=20$ nm ($R_0$ is known for the monodisperse nanoparticles) and $\eta=1.0$ (the solvent used for the system is $H_2O$ at 20° C.) as well as T=20° C. and Boltzmann's constant $k_B$ the value of D is obtained as $D=1,074*10^{-11}$ m²/s. This value is in very good agreement with the value determined by the method according to the invention. Thus it can again be appreciated that the constants to be determined can be determined precisely, in particular due to less computing effort because of the assumptions according to the invention. Furthermore it is evident that a comprehensive evaluation is possible when utilizing the method according to the invention. In particular constants relating to the measuring apparatus can be determined by means of the calibration measurement, such as $a_{xy}$ or $a_z$ or also a in the case of spherical symmetry, which allows the numerical fit in the following evaluation to be carried out simpler and/or more precisely for a more precise determination of the constants characterizing the system or the particles, respectively.

The method according to the invention is explained by means of a further illustrative embodiment in FIGS. 10 and 11. In this illustrative embodiment the method is performed with a first system having only particles of species A and with the second system having only particles of species B as well as a third system having particles of species A, B, and AB. Particle species A and B are particle species being educts emitting emittends and reacting to form product AB according to the reaction equation A+B↔AB with the kinetic constant (association constant) $K_\alpha$. The product AB may again disintegrate into educts A and B with the rate constant (dissociation constant) $K_d$. Product AB emits the same light emitting emittends as educts A, B. A local detection rate $\mu_A(\vec{r})$, $\mu_B(\vec{r})$, $\mu_{AB}(\vec{r})$ and a mean local detection rate $\bar{\mu}_A(\vec{r})$, $\bar{\mu}_{1,B}$, $\bar{\mu}_{1,AB}$ can be assigned to each of the particle species. E.g. the mean local detection rate of the product AB, that is $\bar{\mu}_{1,AB}$, can be predetermined by the sum of the mean local detection rate of the educts A, B, that is $\bar{\mu}_{1,A}$, $\bar{\mu}_{1,B}$, e.g. by the equation $\bar{\mu}_{1,AB}=\alpha_{eff}*(\bar{\mu}_{1,A}+\bar{\mu}_{1,B})$. Herein $\alpha_{eff}$ is an efficiency factor taking in account the effects which restrict the emission of the product, as e.g. quenching effects. By mixing a first system containing exclusively particles of particle species A as emitting particles with a second system containing exclusively the particle species B as emitting particle species a third system is thus obtained, wherein the particle species A, B, and AB occur in the third system and the partial concentrations $c_A$, $c_B$, and $c_{AB}$ of the particle species A, B, and AB in the third system vary with time at least until a steady-state is reached. The method according to the invention is very well suited for determining the partial concentrations or the time-dependent behavior of the respective partial concentrations $c_A$, $c_B$ and $c_{AB}$, respectively, as outlined in the illustrative embodiment below. Basically the method according to the invention is suited for all particle species or mixtures of particle species, respectively, which can be represented as explained, e.g. also for mixtures of particle species comprising more than three different particle species. In the illustrative embodiment explained below antibodies GAR have been chosen as particle species A, antibodies RAM as particle species B and the complex of both antibodies as particle species AB. Particle species A as well as particle species B were labeled with the fluorophore Alexa 488. Two fluorophores per particle are bound for each particle species. Thus the particles emit photons as emittends.

In the illustrative embodiment described the partial concentrations $c_A$, $c_B$, and $c_{AB}$ as well as the association constant $K_\alpha$ are to be determined by numerical fit between the theoretical signal function and measurement value function.

Several measurements are performed in order to allow determination of the time dependency of the partial concentration values. For this purpose the theoretical signal function is defined time-dependent:

$$\mu_{sig}(\tau, t_0) = \frac{\sum_{j=1}^{s} \bar{\mu}_{1,j} c_j(t_0) \phi_{1,j}(\tau)}{\lambda + \sum_{j=1}^{s} \bar{\mu}_{1,j} c_j(t_0)} \frac{1}{\tau} = \frac{\sum_{j=1}^{s} \bar{\mu}_{1,j} c_j(t_0) \frac{\phi_{1,j}(\tau)}{\tau}}{\lambda + \sum_{j=1}^{s} \bar{\mu}_{1,j} c_j(t_0)}.$$

This theoretical signal function takes different values depending on a specific point in time to in each case.

The measurement value function is determined for different specific points in time by performing a measurement assigned to the point in time at different specific points in time. The measurement function utilized at each specific point in time $t_0$ is:

$$\mu_{Mess}(\tau, t_0) = \frac{Q(\tau, t_0)}{\tau} = \frac{\sigma(\tau, t_0)^2 - \bar{n}(\tau, t_0)}{\tau * \bar{n}(\tau, t_0)}.$$

In the present case the number s of particle species is three which results from the particle species A, B, and AB.

In the illustrative embodiment described the numerical fit between the measurement value functions assigned to the specific points in time and the theoretical signal function at the specific points in time is carried out by fitting the limit values of both functions at bin time $\tau \to 0$. It is necessary to form the limit value $$\lim_{\tau \to 0}$$

of the theoretical signal function. Assuming for simplicity negligible noise performance $\lambda$, the limit is formed by $$\lim_{\tau \to 0} \mu_{sig}(\tau, t_0) = \frac{\sum_{j=1}^{s} \bar{\mu}_{1,j} c_j(t_0) \left[\lim_{\tau \to 0} \frac{\phi_{1,j}(\tau)}{\tau}\right]}{\sum_{j=1}^{s} \bar{\mu}_{1,j} c_j(t_0)}.$$

By means of the relations $\bar{\mu}_{1,j} = \text{const} * \mu_{0,j}$;

$$\lim_{\tau \to 0} \frac{\phi_{1,j}(\tau)}{\tau} = \frac{\mu_{0,j}}{2\sqrt{2}}$$

explained above the formation of the limit value of the theoretical signal function results as:

$$\lim_{\tau \to 0} \mu_{sig}(\tau, t_0) = \frac{1}{2\sqrt{2}} \frac{\sum_{j=1}^{s} \mu_{0,j}^2 c_j(t_0)}{\sum_{j=1}^{s} \mu_{0,j} c_j(t_0)}.$$

In the present illustrative embodiment of the particles of particle species A and the particles in particle species B are labeled with the same number of fluorophores and exhibit the same local detection rate. The particle species AB has twice the number of fluorophores as compared to the particle species A and B so that the local detection rate of particle species AB is twice the detection rate of particle species A and B. Thus it can be established for the mean local detection rate of a specific particle of the respective particle species $\bar{\mu}_{1,AB} = 2\bar{\mu}_{1,A} = 2\bar{\mu}_{1,B}$. Assuming in accordance with the invention that the distribution of the local detection rate is identical for the different particle species it can thus be formulated: $\mu_{0,AB} = 2\mu_{0,A} = 2\mu_{0,B} = 2\mu_0$ Thus the formation of the limit of the theoretical signal function can be formulated:

$$\lim_{\tau \to 0} \mu_{sig}(\tau, t_0) = \frac{\mu_0}{2\sqrt{2}} \frac{c_A(t_0) + c_B(t_0) + 4c_{AB}(t_0)}{c_A(t_0) + c_B(t_0) + 2c_{AB}(t_0)}$$

Assuming that $K_D \approx 0$, that is assuming a stable product AB which does not disintegrate and assuming start concentrations $A_0$ and $B_0$ the following dependencies of the time-dependent concentrations on the association constant are obtained from the rate equations of kinetics describing the kinetics of the reaction of particles A and B to product AB:

$$c_A(t) = \frac{A_0(A_0 - B_0)}{A_0 - B_0 e^{(B_0 - A_0) K_a t}}.$$

$$c_B(t) = \frac{B_0(A_0 - B_0)}{A_0 e^{(A_0 - B_0) K_a t} - B_0}.$$

$$c_{AB}(t) = A_0 B_0 \frac{e^{(A_0 - B_0) K_a t} - 1}{A_0 e^{(A_0 - B_0) K_a t} - B_0}.$$

Thus the theoretical signal function becomes:

$$\lim_{\tau \to 0} \mu_{sig}(\tau, t) = \frac{\mu_0}{2\sqrt{2}} \frac{3A_0 + B_0 + \frac{2A_0(A_0 - B_0) e^{A_0 K_a t}}{B_0 e^{B_0 K_a t} - A_0 e^{A_0 K_a t}}}{A_0 + B_0}.$$

From this time-dependent theoretical signal function the limit values of the theoretical signal function can be determined when considering the limit $$\lim_{\tau \to 0}$$

at the specific points in time $t_0$. These limit values can then be fitted with limit values the measurement value function takes for $$\lim_{\tau \to 0}$$

when determined in each case at a specific point in time $t_0$.

Figure 10A:
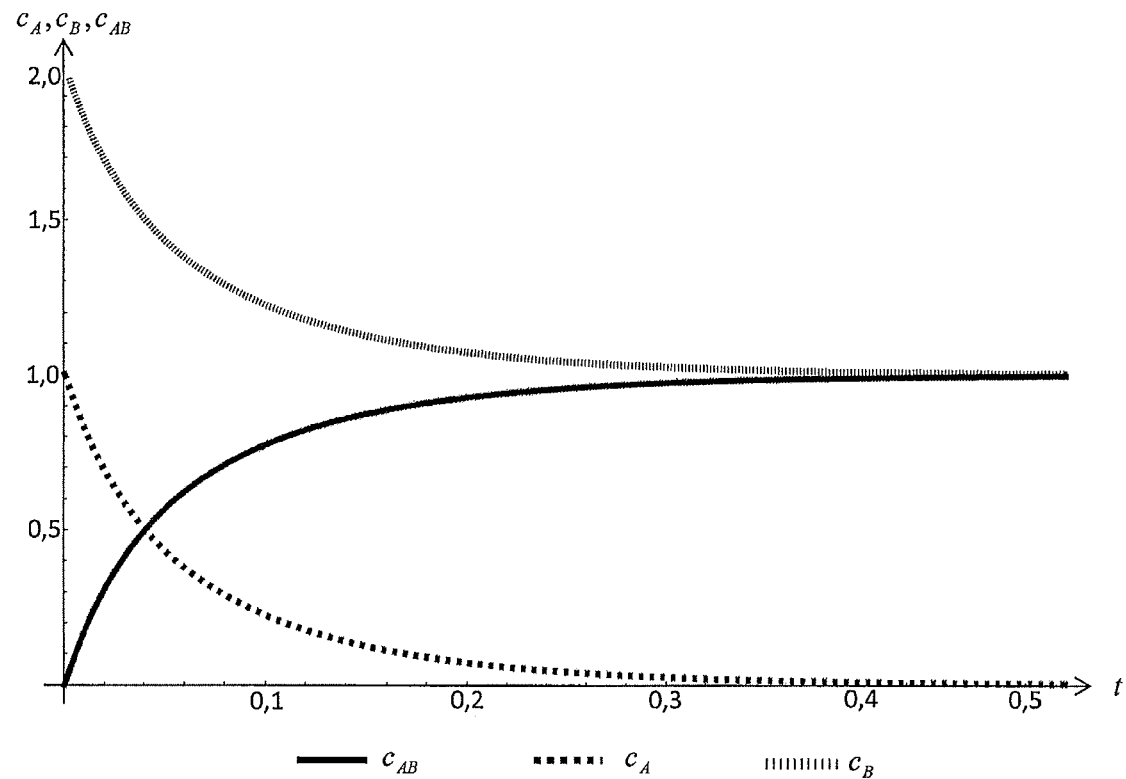
FIGS. 10a-10b are graphic representations of simulations of the behavior of parameters of a system to be investigated.

The results of the illustrative embodiment described are explained in FIGS. 10 and 11. FIG. 10a shows the time-dependent behavior of the partial concentrations $c_A(t)$, $c_B(t)$, and $c_{AB}(t)$ which results by calculation from the rate equations mentioned above, wherein $$10 \frac{l}{\mathrm{mol}\, s}$$

is being assumed as the value of the association constant $K_\alpha$. It was assumed further that $$B_0 = 2A_0 = 2\frac{\mathrm{mol}}{l}.$$

It is evident from FIG. 10a that the partial concentrations $c_A$ and $c_B$ are $A_0$ and $B_0$, respectively, at the start of the reaction, that is at the point in time when particle species A is mixed with particle species B, and that the partial concentrations $c_A$ and $c_B$ decrease with time while the partial concentration of particle species AB, the particles of which are formed from particles A and B, increases.

Figure 10B:
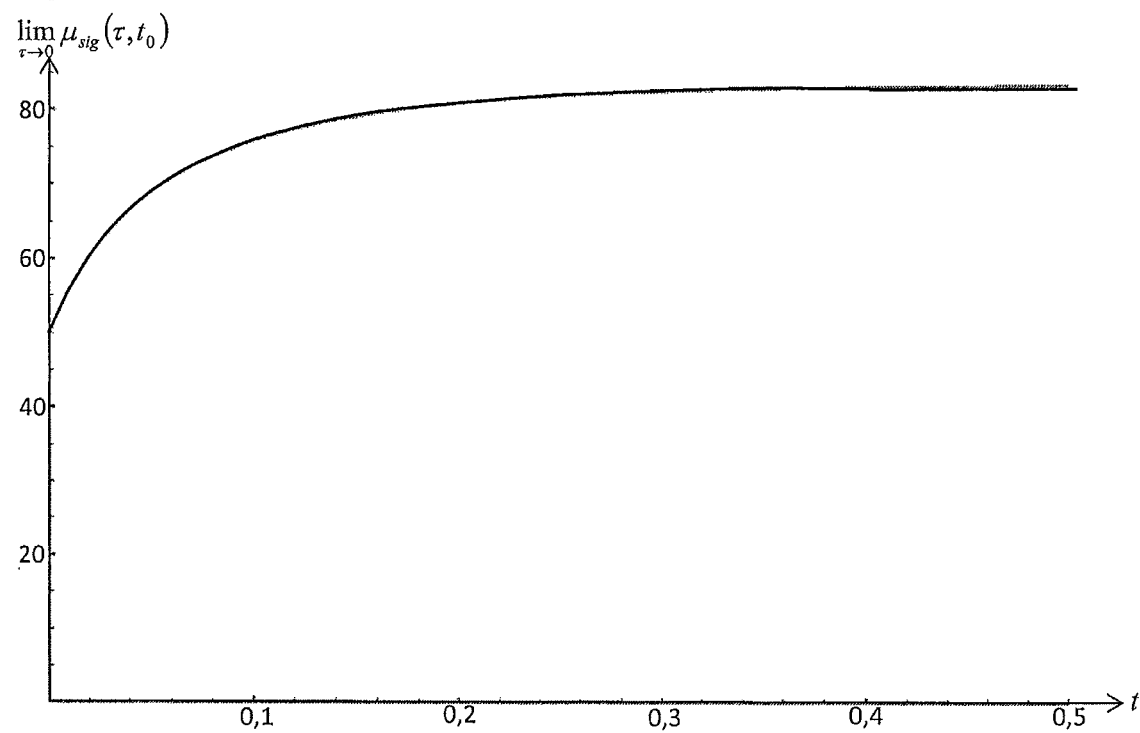
Figure 11A:
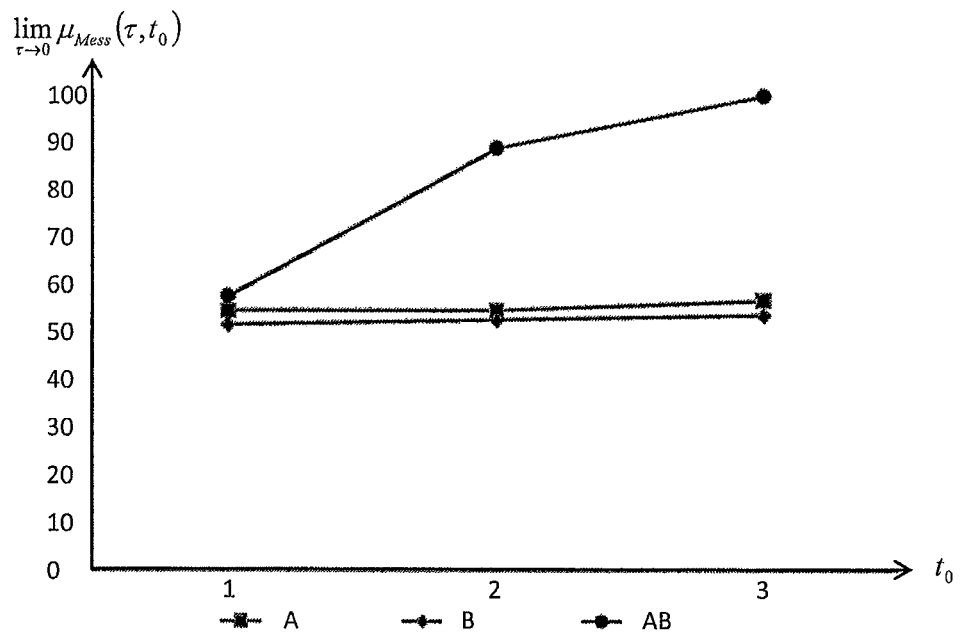
FIGS. 11a-11b are graphic representations of measurements relating to the behavior of parameters of the system shown in FIG. 10.
Figure 11B:
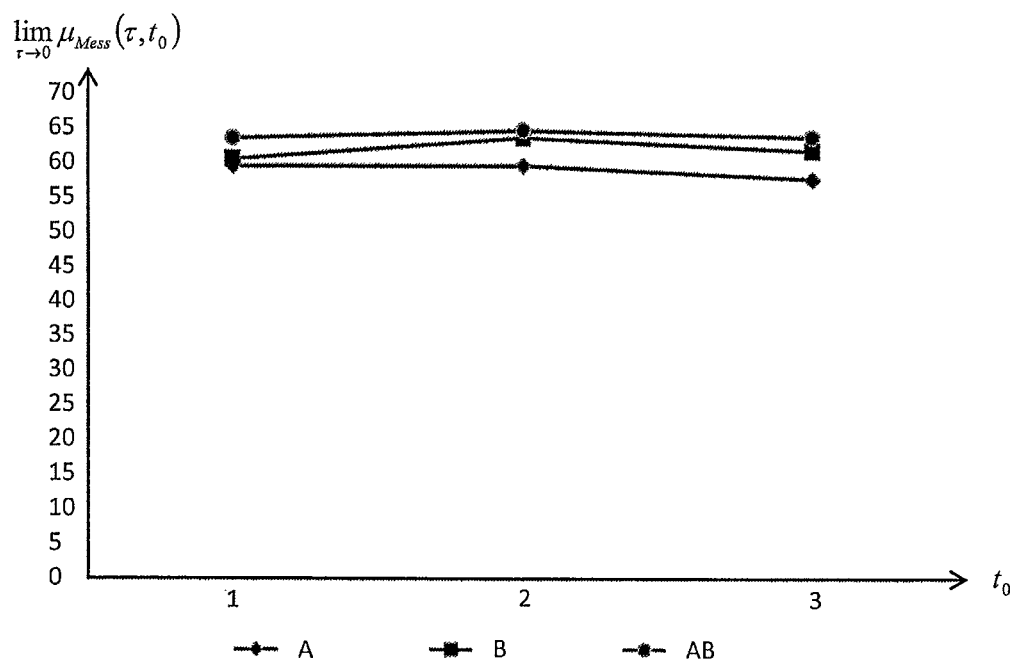

In FIG. 10b the values of the theoretical signal function resulting from the above-mentioned equation under the assumption $\mu_0 = 50$ kcps are represented. As evident from FIG. 10b the local detection rate of the mixture of the particle species A and B increases with increasing time. The local detection rate starts at 50 kcps and ends at about 84 kcps. This is attributable to the effect that at complete reaction of particle species A with particle species B because of the higher number of particles of particle species B particles of particle species B are still present in the mixture, so that the local detection rate representing the mean local detection rate of one individual particle of the mixture and therefore takes in account the local detection rate of particles AB as well as that of particles B is not twice the starting rate.

The limit values of the measurement value functions for $$\lim_{\tau \to 0}$$

which result from measurements at different points in time $t_0$ are shown in FIG. 11. Each measurement value was determined by performing one measurement during one measuring period at one measurement point in time $t_0$ followed by determining the measurement value function by varying the bin time and then determining the limit value of the measurement value function for $$\lim_{\tau \to 0}$$

from the numerical fit. In the present illustrative embodiment the limit values of the measurement value functions for the different systems were determined, that is for a first system having particle species A, a second system having particle species B and a third system where the particle species A and particle species B are mixed, so that there particle species AB occurs. While no reaction inhibiting substance was added to the third system in the measurement according to FIG. 11a, urea was added as reaction inhibiting substance in the measurement according to FIG. 11b. It is evident from FIGS. 11a, 11b that the limit values of the measurement value function for the first and the second system remain approximately constant independent on the measurement point in time, while the limit value of the measurement value function for the third system in the case of FIG. 11a starts increasing at later points in time and in the case of FIG. 11b where the reaction between particles A and B is inhibited, is also essentially independent on the measurement point in time. It is evident from synopsis of FIGS. 10 and 11 that the theoretical signal function as determined according to the invention and employed according to the invention in the fitting with the measurement value function very well agrees with the performance of the measurement value function. Thus the determination of the relevant constants, e.g. the constant $K_\alpha$ in the present illustrative embodiment, is possible in a simple and precise manner.

Basically the method according to the invention can be employed in any measuring environment. E.g. the method according to invention is suited for biochemical analysis in solutions or on surfaces. Surfaces can be functionalized units or can also be natural units as e.g. cell membranes. Moreover the method according to the invention is suited for use in fluidic systems. E.g. measurements using a construction being designed as a Y-structure type, where two different particle species are fed through both legs of the Y which are mixed at the merger point so that by measuring at the merger point and with increasing distance from this point the performance of the mixture can be ascertained.

LIST OF REFERENCE SIGNS 1 sample
2 light source
3 illumination lens
4 stimulation filter
5 dichroic mirror
6 lens
7 emission filter
8 tube lens
9 Pinhole
10 detection unit
11 data sampling unit
12 computer
100 sample plane

What is claimed is:

1. A fluorescence fluctuation spectroscopy system comprising:
   a light source configured to emit light;
   a lens configured to focus the light emitted by the light source onto a sample plane;
   a tube lens configured to concentrate a beam emitted by a sample, the beam comprising a plurality of particles of at least one species j;
   a detection unit and a data sampling unit configured to detect a number n of emissions of the particles from the beam during a plurality of time intervals of a measuring period and provide a timestamp; and
   a computer comprising one or more processors and one or more non-transitory computer readable storage devices having stored thereon instructions that when executed by the one or more processors result in the following operations during an evaluation step for quantification of particles emitting specific emittends and for characterizing the time-dependent performance of the particles in the system, the evaluation step being carried out for the plurality of several time intervals each having the same interval width and further comprising determining a distribution function p(n) of the number n of the emissions detected, the operations comprising:

stipulating different bin times τ for the interval width, wherein the evaluation step is performed for each bin time τ;

determining a distribution function $p_\tau(n)$ for the different bin times τ;

determining moments $m_{i,\tau}^{Mess}$ of the distribution function $p_\tau(n)$ for each bin time τ and determining bin time dependent moment functions $m_i^{Mess}(\tau)$ therefrom;

determining constants characterizing the particles in the system by a numerical fit of a theoretical signal function comprising moments $m_i^{sig}(T)$ of a theoretical signal distribution $P_{sig}(n,\tau)$, which indicates an expected signal distribution determined by means of theoretical functions, to a measurement value function comprising the moment functions $m_i^{Mess}(\tau)$.

2. The fluorescence fluctuation spectroscopy system according to claim 1, wherein the one or more non-transitory computer readable storage devices further comprise instructions stored thereon that when executed by the one or more processors result in the following operations:

determining the theoretical signal function based upon a definition of the theoretical signal distribution $P_{sig}(n,\tau)$ which is based on:

a specific local detection rate $\mu_j(\vec{r})=\mu_{0,j}f(\vec{r})$ for a particle of species j, wherein $\mu_j(\vec{r})=\mu_{0,j}f(\vec{r})$ represents a characteristic detection brightness of a particle;

a specific local probability distribution;

a specific local emission probability of the particles of species j; and a specific measurement volume V in which the particles have to reside so that emissions of the particles can be detected;

wherein $P_{sig}(n,\tau)$ comprises the local detection rate $\mu_j(\vec{r})$, a partial concentration $c_1$ and a decay time $\theta_j$ of the particle species j as well as a noise performance of a measuring apparatus as parameters independent of bin time and wherein the constants relate at least to the parameters $\mu_{0,j}$, $\theta_j$, and $c_j$.

3. The fluorescence fluctuation spectroscopy system according to claim 1, wherein for s different particle species, a theoretical species signal distribution $P_{sig}^j(n,\tau)$ is stipulated for each particle species;

and wherein the one or more non-transitory computer readable storage devices further comprise instructions stored thereon that when executed by the one or more processors result in the following operations:

determining the theoretical signal distribution $P_{sig}(n,\tau)$ of the system based on, at least in part, an s+1-fold convolution of the s different signal distributions $P_{sig}^j(n,\tau)$ of the s different species and a noise signal distribution $P_{noise}(n,\tau)$.

4. The fluorescence fluctuation spectroscopy system according to claim 3, wherein the measurement value function is based on $$Q(\tau) = \frac{\sigma^2(\tau) - \bar{n}(\tau)}{\bar{n}(\tau)}$$

and the numerical fit is determined based on the relation $$\frac{\sum_{j=1}^{s} \bar{\mu}_{1,j} c_j \phi_{1,j}(\tau)}{\lambda + \sum_{j=1}^{s} \bar{\mu}_{1,j} c_j},$$

wherein s different particle species are assumed in the system and λ represents a noise constant.

5. The fluorescence fluctuation spectroscopy system according to claim 4, wherein the numerical fit is determined based on the relation $Q(\tau)=\phi_{1,j}(\tau)$ when the system has only one particle species j as the only species emitting the emittends.

6. The fluorescence fluctuation spectroscopy system according to claim 1, wherein a measurement volume V used in the definition of $P_{sig}(n,\tau)$, the measurement volume V being defined by, at least in part, a bin time dependent, fictitiously introduced effective volume $V_{eff,j}(\tau)$, wherein by definition at least one emission from each particle of species j residing in the volume $\tau V_{eff,j}(\tau)$ is detected during the bin time τ and the particle does not leave $\tau V_{eff,j}(\tau)$ during the bin time τ, and wherein the one or more non-transitory computer readable storage devices further comprise instructions stored thereon that when executed by the one or more processors result in the following operations:

determining a mean number of particles of species j in $V_{eff,j}(\tau)$ based on, at least in part, a mean occupation number $\omega_j(\tau)$ with $\omega_j(\tau)=c_j V_{eff,j}(\tau)\tau$.

7. The fluorescence fluctuation spectroscopy system according to claim 6, wherein the one or more non-transitory computer readable storage devices further comprise instructions stored thereon that when executed by the one or more processors result in the following operations:

using a Poisson distribution as distribution of the occupation number.

8. The fluorescence fluctuation spectroscopy system according to claim 1, wherein determining the theoretical signal distribution $P_{sig}(n,\tau)$ is based on the local emission probability of the particles being distributed according to a Poisson distribution.

9. The fluorescence fluctuation spectroscopy system according to claim 1, wherein the one or more non-transitory computer readable storage devices further comprise instructions stored thereon that when executed by the one or more processors result in the following operations:

determining, for each bin time τ, the bin time dependent mean value $\bar{n}(\tau)$ and the bin time dependent variance $\sigma^2(\tau)$ from the distribution functions $p_\tau(n)$, wherein the measurement value function comprises $\bar{n}(\tau)$ and $\sigma^2(\tau)$.

10. The fluorescence fluctuation spectroscopy system according to claim 9, wherein:

the measurement value function based on $$Q(\tau) = \frac{\sigma(\tau)^2 - \bar{n}(\tau)}{\bar{n}(\tau)};$$

and wherein the one or more non-transitory computer readable storage devices further comprise instructions stored thereon that when executed by the one or more processors result in the following operations:

determining the numerical fit based on the relation $$Q(\tau) = \frac{\sigma(\tau)^2 - \bar{n}(\tau)}{\bar{n}(\tau)} = \frac{m_2^{sig}(\tau) - [m_1^{sig}(\tau)]^2 - m_1^{sig}(\tau)}{m_1^{sig}(\tau)},$$

wherein $m_1^{sig}(\tau)$ represents the first moment and $m_2^{sig}(\tau)$ represents the second moment of $P_{sig}(n,\tau)$.

11. The fluorescence fluctuation spectroscopy system according to claim 1, wherein the one or more non-transitory computer readable storage devices further comprise instructions stored thereon that when executed by the one or more processors result in the following operations:
    defining the theoretical signal function as time-dependent;
    performing several measurements at a respective specific point in time assigned to the respective measurement;
    determining, for each of the measurements, a bin time dependent measurement value function assigned to the respective specific point in time;
    approximating each measurement value function based on, at least in part, n approximation graph;
    determining a limit value of the respective measurement value function associated with the measurement value function for $$\lim_{\tau \to 0}$$

from the approximation graph of each measurement value function;
    determining limit values of the theoretical signal function at the specific points in time for $$\lim_{\tau \to 0}$$

based on, at least in part, a limit consideration $$\lim_{\tau \to 0}$$

of the theoretical signal function; and
    calculating the numerical fit by fitting the limit value of one of the measurement value functions to the limit value of the theoretical signal function at the specific point in time assigned to this measurement value function.

12. The fluorescence fluctuation spectroscopy system according to claim 1, wherein the one or more non-transitory computer readable storage devices further comprise instructions stored thereon that when executed by the one or more processors result in the following operations:
    determining a mean local detection rate $\bar{\mu}_{1,j}$ of the species j based on, at least in part, integral $$\bar{\mu}_{1,j} = \int_R d^3 r \mu_j(\vec{r})$$

over a space R,
    wherein the mean local detection rate $\bar{\mu}_{1,j}$ of the species j is introduced as a parameter independent on bin time into the theoretical signal distribution $P_{sig}(n,\tau)$.

13. The fluorescence fluctuation spectroscopy system according to claim 1, wherein:
    for a stochastic transport of the particles, the one or more non-transitory computer readable storage devices further comprise instructions stored thereon that when executed by the one or more processors result in the following operations:
    establishing a mean detected emission number of a single particle of species j based on $$\phi_{1,j}(\tau) = \frac{\int_0^\tau dt \int_R d^3 r_0 \left( \int_R d^3 r \mu_j(\vec{r}) \psi_j(\vec{r}, t | \vec{r}_0) \right)^2}{\int_R d^3 \mu_j(\vec{r})};$$

and
    for a deterministic transport of the particles, the one or more non-transitory computer readable storage devices further comprise instructions stored thereon that when executed by the one or more processors result in the following operations:
    establishing a mean detected emission number of a single particle of species j based on $$\phi_{1,j}(\tau) = \frac{\int_R d^3 r_0 \left( \int_0^\tau dt \int_R d^3 r \mu_j(\vec{r}) \psi_j(\vec{r}, t | \vec{r}_0) \right)^2}{\int_R d^3 \mu_j(\vec{r})}$$

wherein R an unlimited space.

14. The fluorescence fluctuation spectroscopy system according to claim 1, wherein a local detection rate $\mu_j(\vec{r})$ is based on a Gaussian function $$\mu_j(\vec{r}) = \mu_{0,j} \exp\left(-\frac{2}{a_{xy}^2}(x^2 + y^2)\right) \exp\left(-\frac{2}{a_z^2} z^2\right)$$

with constants $a_{x,y}$ and $a_z$ $\mu_j(\tau)$.

15. The fluorescence fluctuation spectroscopy system according to claim 1, wherein for a fluidic transport of the particles with transport velocity v, the one or more non-transitory computer readable storage devices further comprise instructions stored thereon that when executed by the one or more processors result in the following operations:
    defining the theoretical signal distribution $P_{sig}(n,\tau)$ based on a mean detected emission number of one single particle of species j according to $$\phi_{1,j}(\tau) = \frac{\sqrt{\pi}}{2\sqrt{2}} \frac{\mu_{0,j}}{2a} \frac{\vartheta_j^2}{\tau} \int_{-\infty}^{\infty} dz_0 \left( \text{erf}\left[\frac{1}{\vartheta_j}\left(\frac{z_0}{v} + \tau\right)\right] - \text{erf}\left[\frac{z_0}{v\vartheta_j}\right] \right)^2.$$

16. The fluorescence fluctuation spectroscopy system according to claim 1, wherein for a diffusion transport of the particles with spherical measurement symmetry, the one or more non-transitory computer readable storage devices further comprise instructions stored thereon that when executed by the one or more processors result in the following operations:
    defining the theoretical signal distribution $P_{sig}(n,\tau)$ based on a mean detected emission number of one single particle of species j according to $$\phi_{1,j}(\tau) = \frac{\mu_{0,j}}{\sqrt{2}} \vartheta_j \left(1 - \frac{1}{\sqrt{1 + \frac{\tau}{\vartheta_j}}}\right).$$

17. The fluorescence fluctuation spectroscopy system according to claim 1, wherein for a diffusion transport of the particles with rotation ellipsoidal measurement symmetry, the one or more non-transitory computer readable storage devices further comprise instructions stored thereon that when executed by the one or more processors result in the following operations:

defining the theoretical signal distribution $P_{sig}(n,\tau)$ based on a mean detected emission number of one single particle of species j according to $$\phi_{1,j}(\tau) = \frac{\mu_{0,j}}{2^{\frac{3}{2}}} \int_0^\tau \frac{dt}{\left(1 + \frac{t}{\vartheta_{j,xy}}\right)\sqrt{1 + \frac{t}{\vartheta_{j,z}}}},$$

with decay times $\theta_{j,xy}$ and $\theta_{j,z}$ for particles of species j.

* * * * *